(12) United States Patent
Holzheu et al.

(10) Patent No.: US 6,870,294 B2
(45) Date of Patent: Mar. 22, 2005

(54) WINDING WITH MOULDED PARTS, METHOD AND SET OF MOULDED PARTS FOR ELECTRICAL MACHINES

(75) Inventors: Georg Holzheu, Schongau (DE); Ullrich Masberg, Rösrath/Kleineichen (DE); Michael Menhart, Holzhausen-Igling (DE); Andreas Gründl, München (DE); Bernhard Hoffman, Starnberg (DE); Reinhard Rasch, Hechendorf (DE)

(73) Assignee: Continental ISAD Electronic Systems GmbH & Co. oHG, Landsberg (DE)

( * ) Notice: Subject to any disclaimer, the term of this patent is extended or adjusted under 35 U.S.C. 154(b) by 0 days.

(21) Appl. No.: 10/297,687
(22) PCT Filed: Jun. 1, 2001
(86) PCT No.: PCT/EP01/06272
§ 371 (c)(1),
(2), (4) Date: Jun. 27, 2003
(87) PCT Pub. No.: WO01/95461
PCT Pub. Date: Dec. 13, 2001

(65) Prior Publication Data
US 2004/0046475 A1 Mar. 11, 2004

(30) Foreign Application Priority Data
Jun. 8, 2000 (DE) .......................................... 100 28 380
Mar. 9, 2001 (DE) ......................................... 101 11 509

(51) Int. Cl.$^7$ ............................................... H02K 21/00
(52) U.S. Cl. ...................................... 310/201; 310/208
(58) Field of Search ........................ 310/179, 201–208, 310/210, 211; 29/605

(56) References Cited

U.S. PATENT DOCUMENTS 1,775,633 A * 9/1930 Apple ......................... 310/201
1,784,815 A * 12/1930 Apple ......................... 310/211
2,407,935 A * 9/1946 Perfetti et al. ............... 310/201

(List continued on next page.)

FOREIGN PATENT DOCUMENTS

DE 1 006 506 4/1957
DE 42 34 129 A1 5/1994
DE 43 21 236 C1 8/1994

(List continued on next page.)

OTHER PUBLICATIONS

"Fachunde Elektrotechnik," Europa–Lehmittel Publishers, Nourney, Vollmer GmbH & Co., 21 Edition 1996, pp. 331.

Primary Examiner—Dang Le
(74) Attorney, Agent, or Firm—Blakely, Sokoloff, Taylor & Zafman; Stephen M. De Klerk

(57) ABSTRACT

The invention concerns a winding for a post or an armature of an electric machine with a post or armature (32) with slots (34) composed at least in part of L-shaped structural parts (1, 2, 3). In doing so, one leg of an L-shaped structural part each time creates a slot bar (8a, 8b) located in a slot, and the other leg creates a connecting line (6a, 6b) located at a face of the post or armature. Moreover, the invention concerns a winding with several interlaced coils (50, 52, 50', 52', 50", 52") whereby the connecting lines (6) of interlaced coils (50, 52, 52', 50", 52") are staggered and therefore arranged in layers. The invention furthermore concerns a winding with connecting lines (6) flatter than the slot bars (8), styled as a fractional pitched polyphase winding with two slots per pole and branch. The invention also covers a winding consisting of several coils (50, 52, 50', 52' 50", 52"), characterized by the fact that at least two coils (50, 52) are connected in series, whereby the current flows through one coil (50) in the direction of the slot head, and in the other coil (52) in the direction of the slot bottom. The invention also concerns a procedure and a set of structural parts to manufacture a winding for an electric machine.

21 Claims, 15 Drawing Sheets

U.S. PATENT DOCUMENTS

Figure 3:
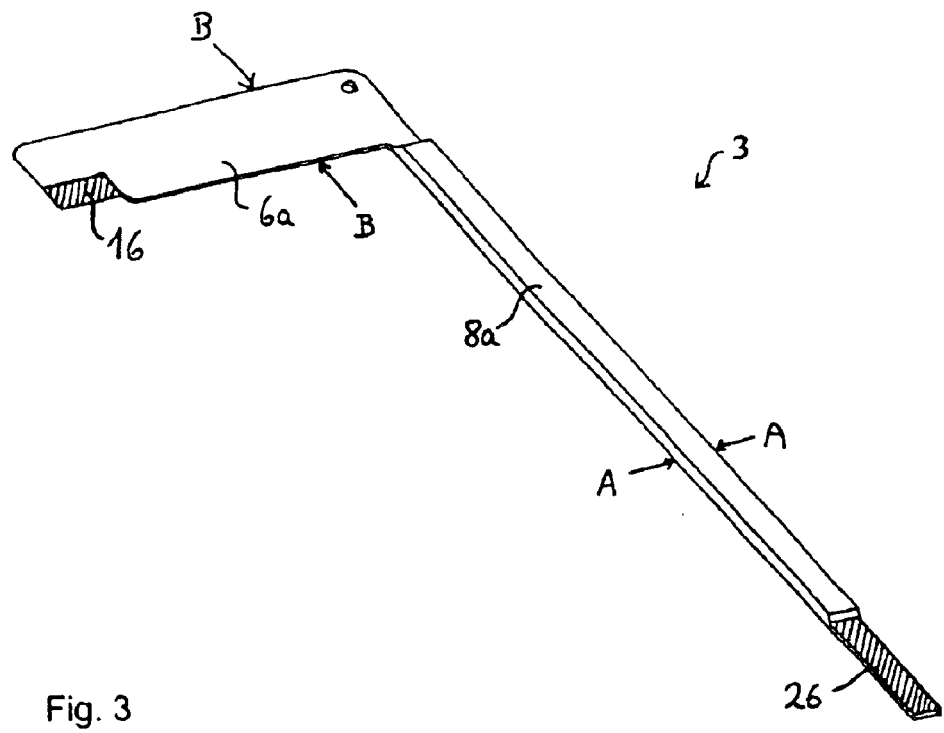

| | | | | |
|---|---|---|---|---|
| 5,196,752 | A | * 3/1993 | Palma | 310/260 |
| 5,422,526 | A | 6/1995 | Kawabata et al. | 320/201 |
| 5,773,905 | A | 6/1998 | Hill | 320/201 |
| 5,801,471 | A | 9/1998 | Hill | 310/179 |
| 5,804,902 | A | 9/1998 | Hill | 310/179 |
| 6,034,462 | A | * 3/2000 | Woodward, Jr. | 310/254 |
| 6,060,810 | A | * 5/2000 | Lee et al. | 310/254 |
| 6,208,058 | B1 | 3/2001 | Taji et al. | 320/201 |
| 6,281,614 | B1 | 8/2001 | Hill | 310/207 |
| 6,445,102 | B1 | 9/2002 | Grundl et al. | 310/201 |

FOREIGN PATENT DOCUMENTS

| | | |
|---|---|---|
| DE | 44 11 749 C2 | 8/1996 |
| DE | 196 32 390 A1 | 2/1998 |
| DE | 197 36 645 A1 | 2/1999 |
| EP | 0 899 850 A1 | 3/1999 |
| GB | 1 329 205 | 9/1973 |

* cited by examiner

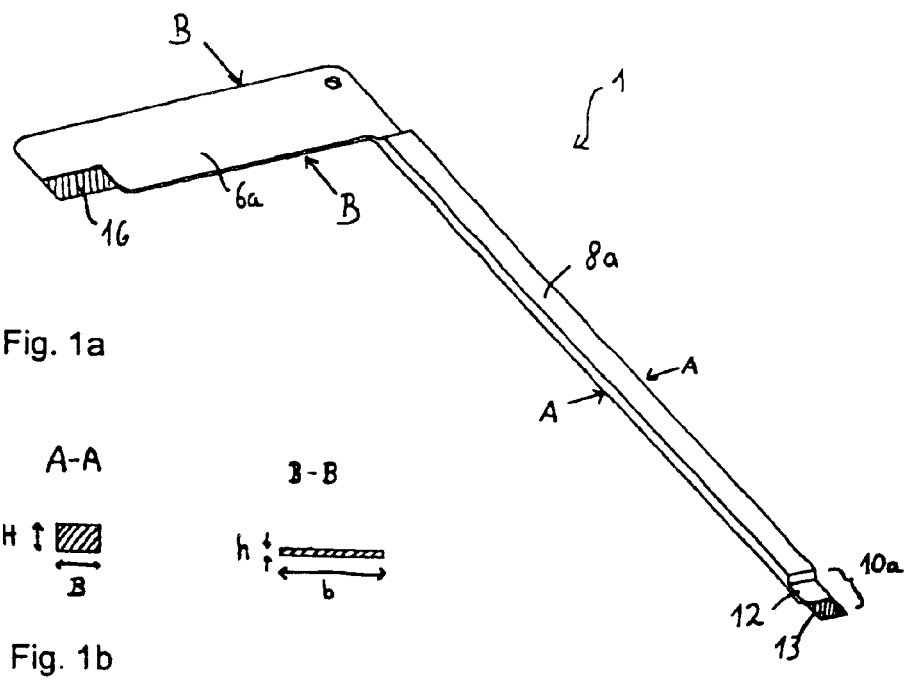
Fig. 1a
Fig. 1b
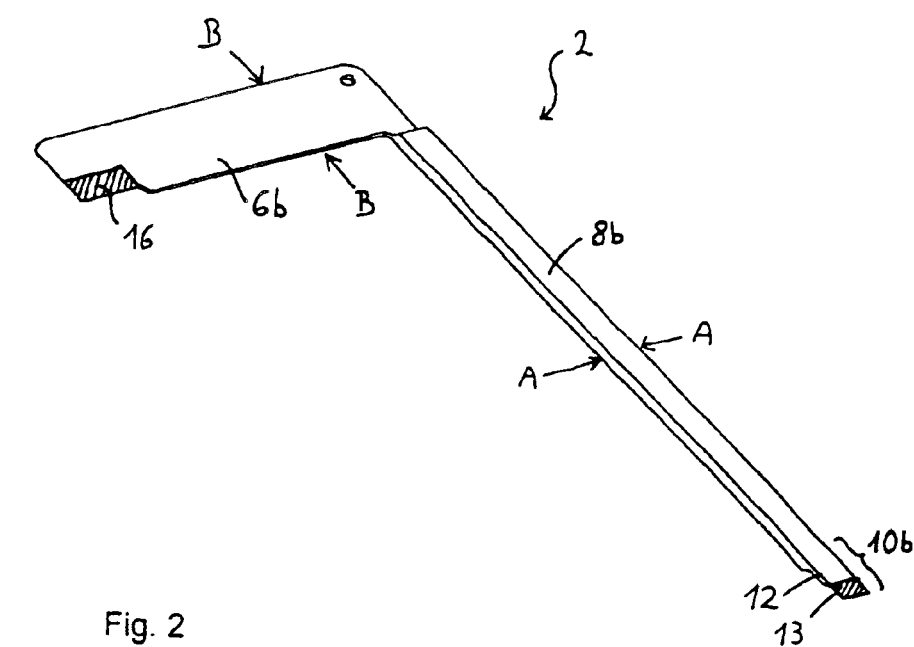
Fig. 2

Fig. 5
a) 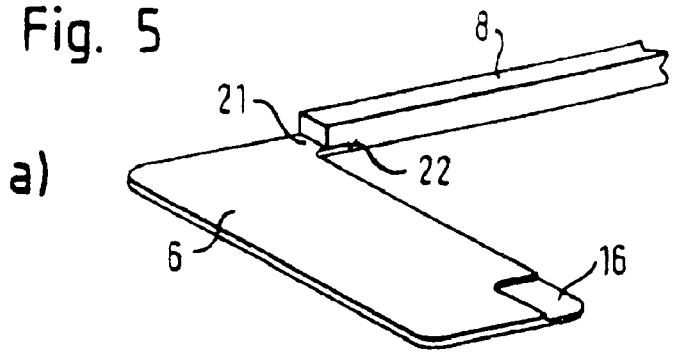
b) 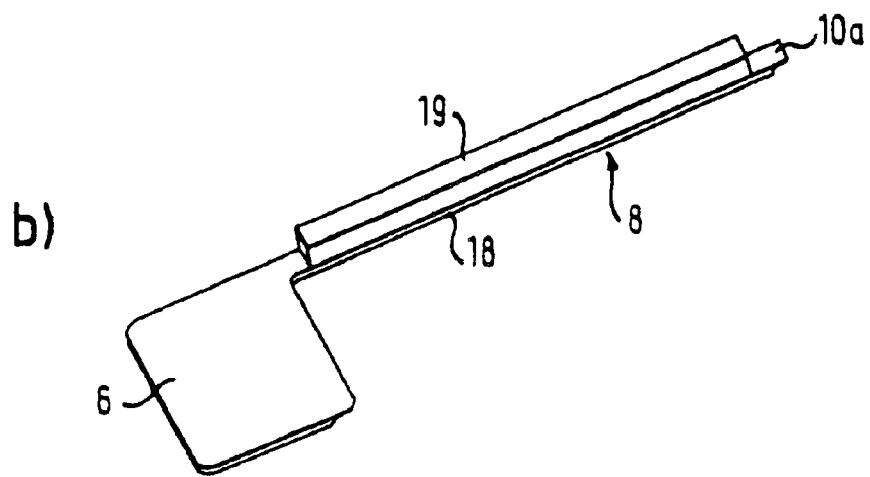
c) 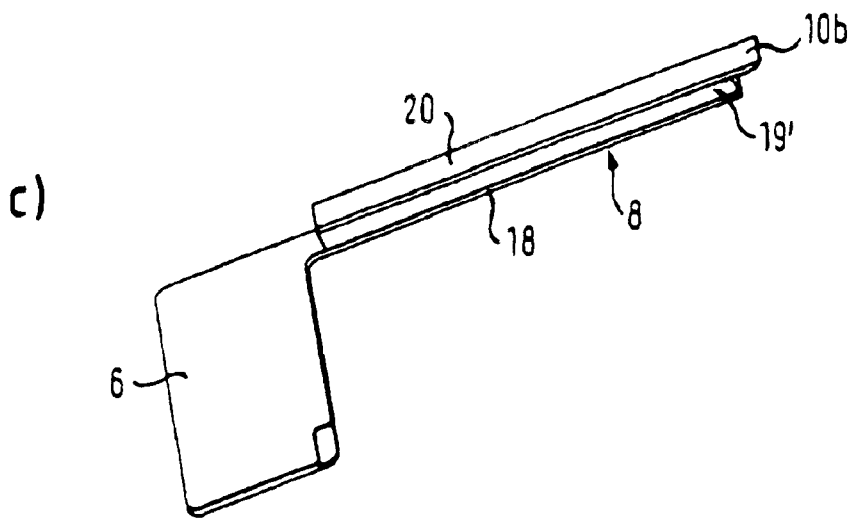

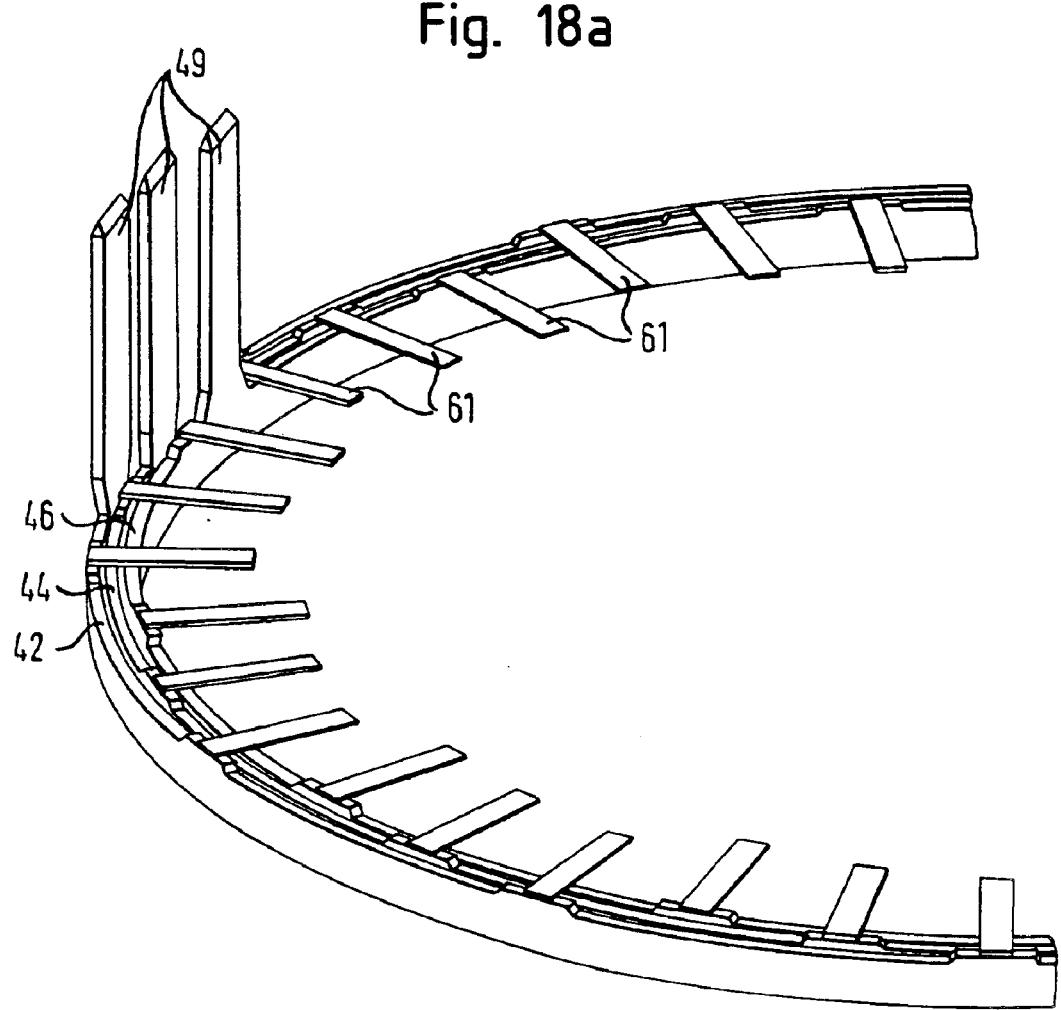

WINDING WITH MOULDED PARTS, METHOD AND SET OF MOULDED PARTS FOR ELECTRICAL MACHINES

CROSS-REFERENCE TO OTHER APPLICATIONS

This Application is a National Phase of International Application No. PCT/EP01/06272, filed on Jun. 1, 2001, which claims priority from German Patent Application No. 101 11 590.1 filed on Mar. 9, 2001 and German Application No. 10028 380.2 filed on Jun. 8, 2000.

The invention concerns windings, and in particular winding for an electric machine with a post and/or armature with slots, as well as a manufacturing method and set of structural parts for such windings. The windings involved are so-called multiple layer windings.

The posts of electric machines (e.g., asynchronous or synchronous machines in a rotary or linear design, whereby "electric machines" refer both to engines as to generators) are generally equipped with a winding. The power flowing through generates a moving magnetic field causing the armature to move over the air gap between the post and the armature. In many designs, the armatures are also equipped with a winding. The winding is generally incorporated in the slots of a post or armature, usually running parallel or in a small angle to the rotational axis in the case of a radial field machine.

The number of phases of the winding of a polyphase alternating current machine generally corresponds with the number of branches, which usually cover several coils with one or more windings. Each coil generally lies with both its so-called "coil sides" in the slots, whereas the so-called end windings connect the sections of the winding located at the front of the post. The coils or serial switches of several coils of a branch are generally connected on one end with a power supply. On the other end, the branches are joined, for example, at the so-called neutral point. Alternatively, the coils could also be delta connected.

The coils of different branches are generally placed in an interlace pattern so coil sides of coils from other branches are to be located between both coil sides of one coil. This is because the coil sides of different branches alternate in consecutive slots or groups of slots in order to produce a magnetic field with a random alternate placement. Therefore, the end windings of the interlaced coils have to go around the face of the post or armature. There are different possible end winding arrangements known for this. In the case of a so-called double or triple deck winding, the end windings of interlaced coils are placed, for example, in different decks in lengthwise direction of the slots. In case of a basket winding, all end windings of a deck connect with another making it look like the edge of a basket. This end winding arrangement is presented, amongst others, on page 331 of the publication "Fachkunde Eletrotechnik", Verlag Europa-Lehrmittel,[1] Nourney, Vollmer GmbH & Co., 22$^{nd}$ edition 1999. Such end windings are fairly protruding and occupy nearly the entire face of the post.

[1] Electro-technics Expertise", Europa Lehrmittel Publishers

End windings with wire-wound coils protrude relatively far from the slots because certain minimum bending radiuses need to be kept. This makes it more difficult to produce a compact end winding arrangement with wire windings. Moreover, wire windings only allow for a relatively low slot-space factor of approx. 40% since the wire generally has a circular cross-section, whereas the slots are usually straight-sided flanked. Spooling a post or slot device with wire-wound coils is rather expensive and hard to automate. For this reason, early suggestions have been made (i.e., in DE-AS-10 06 506) to compose the winding of electric machines of pre-engineered structural parts with a generally rectangular cross-section instead of a wire-wound formation. These pre-engineered structural parts are generally placed one by one in the slots of a post and electrically connected with the coils at the front.

"Slot bars" are those sections of the winding going through the slots and forming the coil sides, "connecting lines" are those sections at the face of the post forming the end windings.

The use of structural parts with a suitable cross-section allows for an increase of the space factor of the slots. The problem of the minimum bending radiuses does not exist when the structural parts at the transition between the slot bar and the connecting line are pre-engineered angle-bent, allowing in principle for compact end winding arrangements. The known state-of-the-art structural part windings with interlaced coils generally require a lot of different and often complex structural parts in order to make the interlaced coils of the end windings evade.

DE 197 36 645 A1 suggests for example to assemble the winding for an electric machine with C-shaped structural parts. The winding of a coil is composed of two C-shaped structural parts placed in the corresponding slots in such a way that the open sides face one another, and by connecting the legs of the structural parts at one face. The legs forming the connecting bars are shaped flatter than the sections of the structural parts in the slots (slots bars) in order to make the end winding arrangement as compact as possible. The end windings of interlaced coils evade because the connecting lines are out of line with the direction of the depth of the slot bars, bundling the connecting lines of a coil at a certain height of the slot depth. A connecting part running in the direction of the slot depth between the slot bar and the connecting line creates this offset bend of conduit. Extra space is needed for the connecting parts mounted at the face creating the offset bend. The publication furthermore suggests to make the c-shaped structural parts of sheet metal stampings folded in such a way that there are enough sheet metal layers in the area of the slot bar to achieve the desired ratio between the slot bar thickness and the connecting line thickness.

DE 44 11 749 C2 describes a post winding composed of U-shaped structural parts welded together in the slot area instead of at the face. First, the entire winding is made without a post, which is added afterwards around the finished winding by placing individual segments made of soft magnetic materials inside the winding. For this winding, the connecting lines are also made flatter than the slot bars in order to enable the different branches to evade at the face. Since the threephase wave winding with one slot per pole and branch shown here only allows for a parallel guiding of a maximum of two branches, the evasion is only possible by placing the connecting lines alternately in an upper or lower layer of connecting lines in the direction of the slot depth. A spiral coil cannot be used for this construction since the structural parts shown do not allow for switching from one winding position to another. "Winding position" refers to all slot bars of a winding with the same distance to the bottom of the slot.

DE 43 21 236 C1 shows a winding made off S-shaped structural parts, each composed of one slot bar and two connecting line halves, bend towards different sides. The connecting lines have the same thickness as the slot bars and run in, an angle in the width- and lengthwise direction of the slot. This arrangement allows for all connecting line halves of a winding arrangement to be placed at the same distance to the bottom of the slot. In case of numerous interlacing branches, the connecting line halves of the structural parts therefore protrude relatively far from the slots. The structural parts are placed into the slots of a post viewed from the head of the slot, and then connected with the superimposed ends of connecting line halves belonging to different winding arrangements. This creates a wave winding with several branches, whereby the winding arrangement of each branch switches every time it passes through the end winding.

DE 196 32 390 A1 further develops this winding with relatively inexpensive structural parts by offsetting each connecting line halve by one half of the thickness of the slot bar in the direction of the slot depth, and by connecting them at the end of the slot bar. Even though a branch is still offset by the thickness of one slot bar when running through the connection between two connecting line halves, the offset of the connecting line to the slot bars compensates this. This arrangement also shows a wave winding. The structural parts are very complex and therefore expensive to manufacture.

The invention describes different aspects of windings for an electric machine with a post and/or armature with slots:

According to a first aspect (claim 1), the winding contains several interlaced coils with at least one complete winding presented at the faces of the connecting lines located at the post or armature. The connecting lines of interlaced coils are staggered and thus arranged in different layers.

According to a second aspect (claim 2), the winding is composed at least in part of L-shaped structural parts. One leg of such an L-shaped structural part presents a slot bar arranged in a slot, and the other leg presents a connecting line located at one face side of the post or armature.

According to a third aspect (claim 3), the winding includes several coils composed of connecting lines arranged in the slot bars in the slots with connecting lines at the face sides of the post or armature. The connecting line is flatter than the slot bars. The winding is designed as a multiphase fractional pitch winding with two slots per pole and per branch.

According to a fourth aspect (claim 4), the winding includes several coils composed of slot bars in the slots and connecting lines at the front of the post or armature. In each case, at least two coils are laid out in a serial switch, whereby the power runs through one of the coils in the direction of the head of the slot heads and the other coil in the direction of the bottom of the slot.

According to another aspect, the invention targets a production method for such a winding. The following steps are repeated several times: (a) The installation of structural parts in the slots of the post or armature until a complete winding arrangement or part of a winding arrangement is used, and (b) the connection of the structural parts installed in step (a) with conductor rails or structural parts used in a previous passage.

According to yet another aspect, the invention is aimed at a set of structural parts for the manufacturing of a winding for an electric machine. This set of structural parts includes one type of an L-shaped structural part or two types of L-shaped structural parts with connecting line legs flatter than the legs of the slot bar. The set of structural parts preferably includes two types of L-shaped structural parts, from which one type is designed to create a connection in one and the same winding arrangement, whereas the other one is designed to create a transition from one winding arrangement into the next.

Finally, the invention is also aimed at a winding for an electric machine, whereby the winding consists of only one or two types of structural parts. Moreover, the winding possibly has one or two more types of structural parts for the purpose of creating a circuit for the winding.

Figure 4:
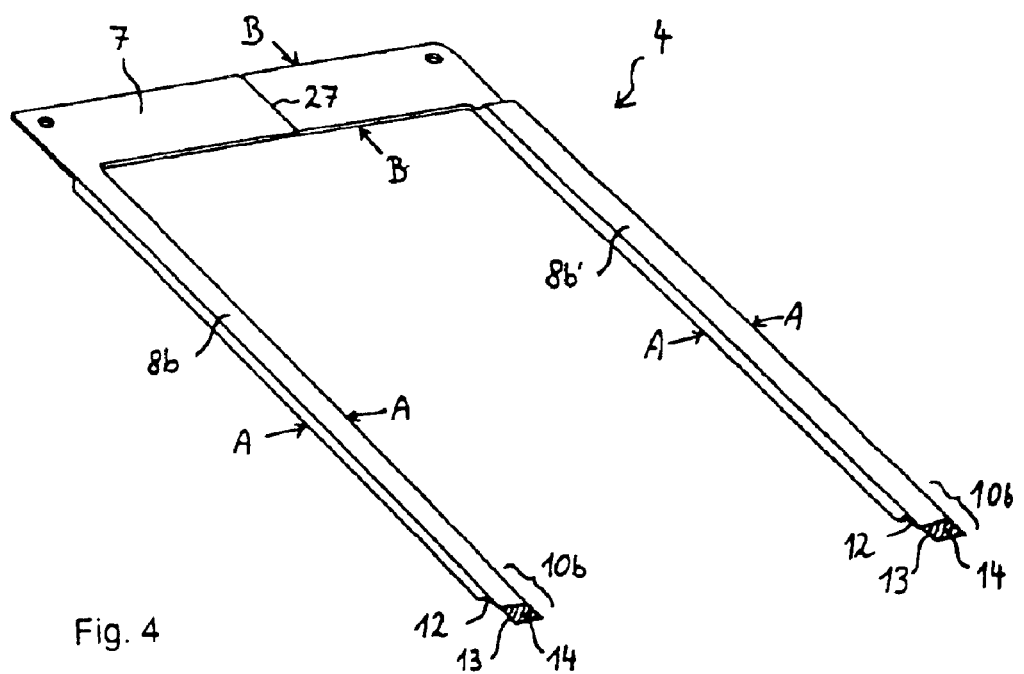
Figure 6:
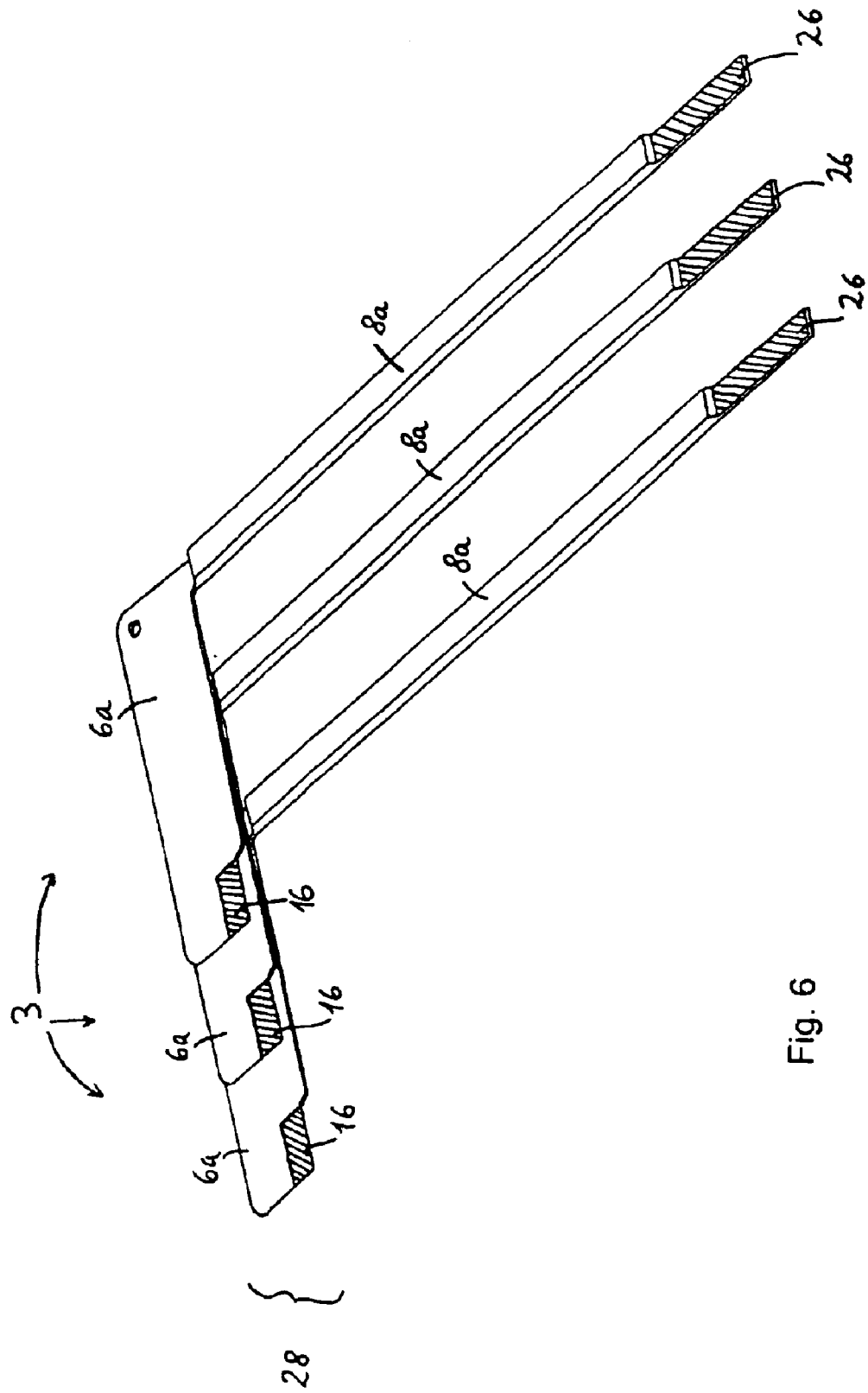
Figure 7:
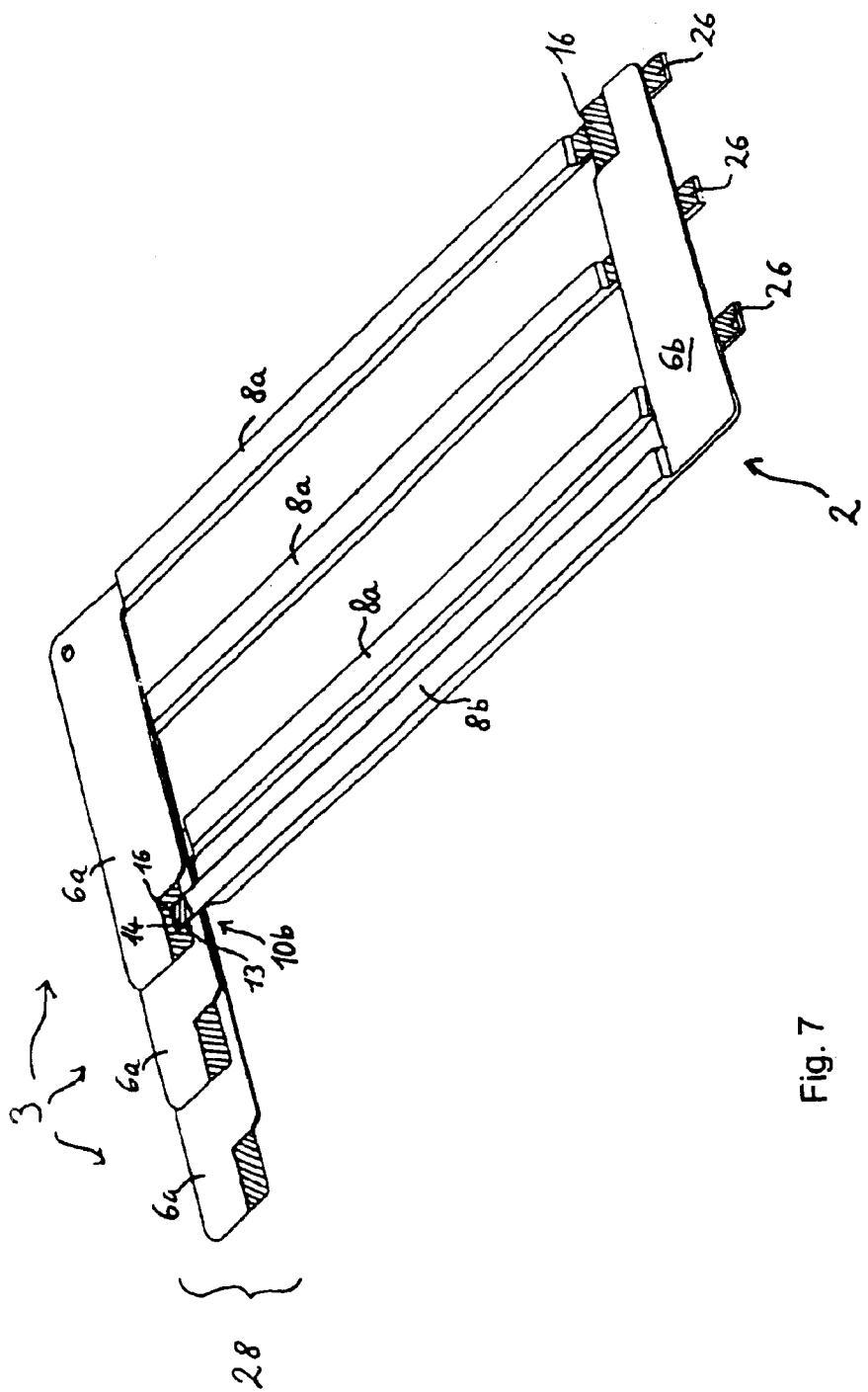
Figure 8:
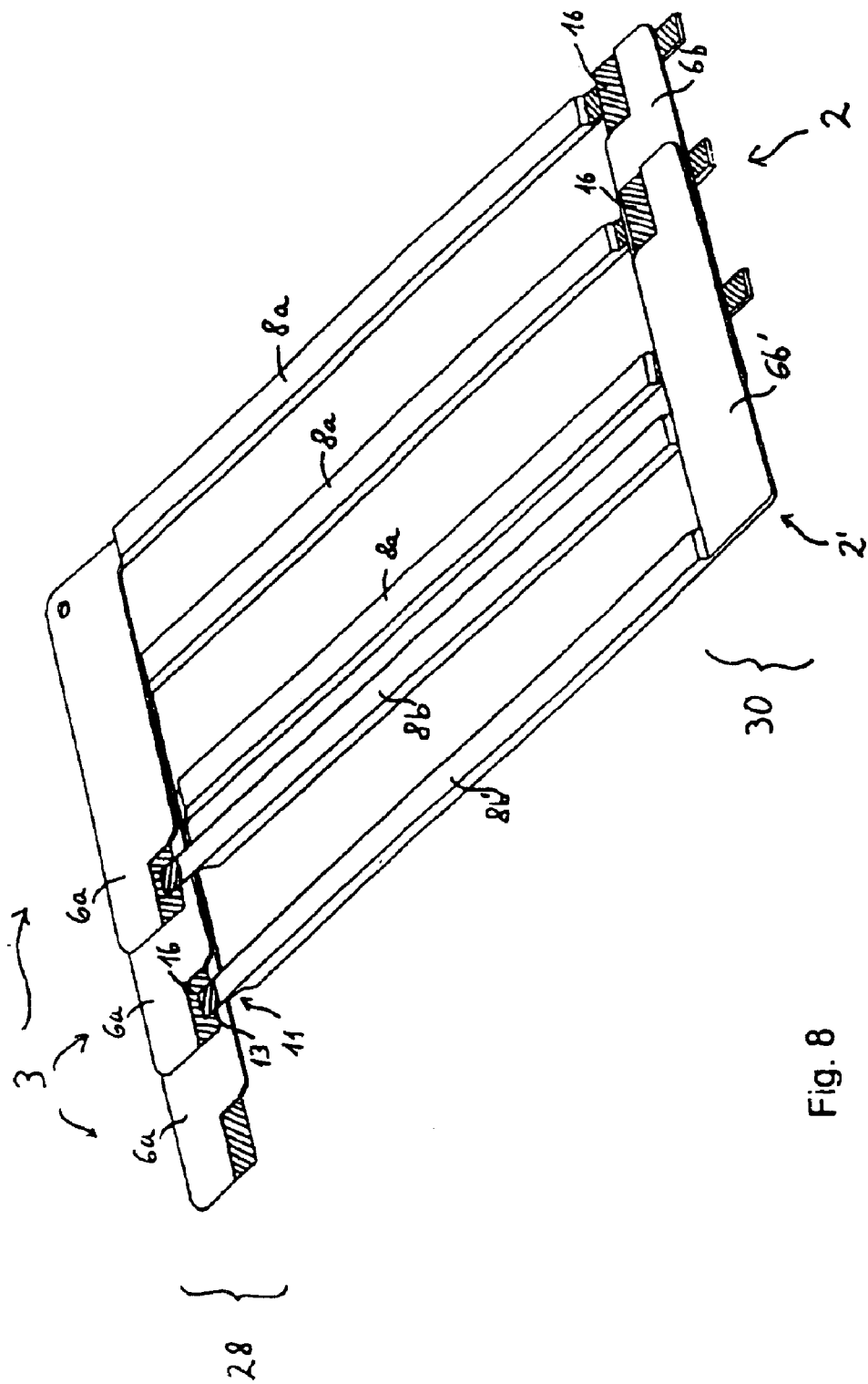
Figure 9:
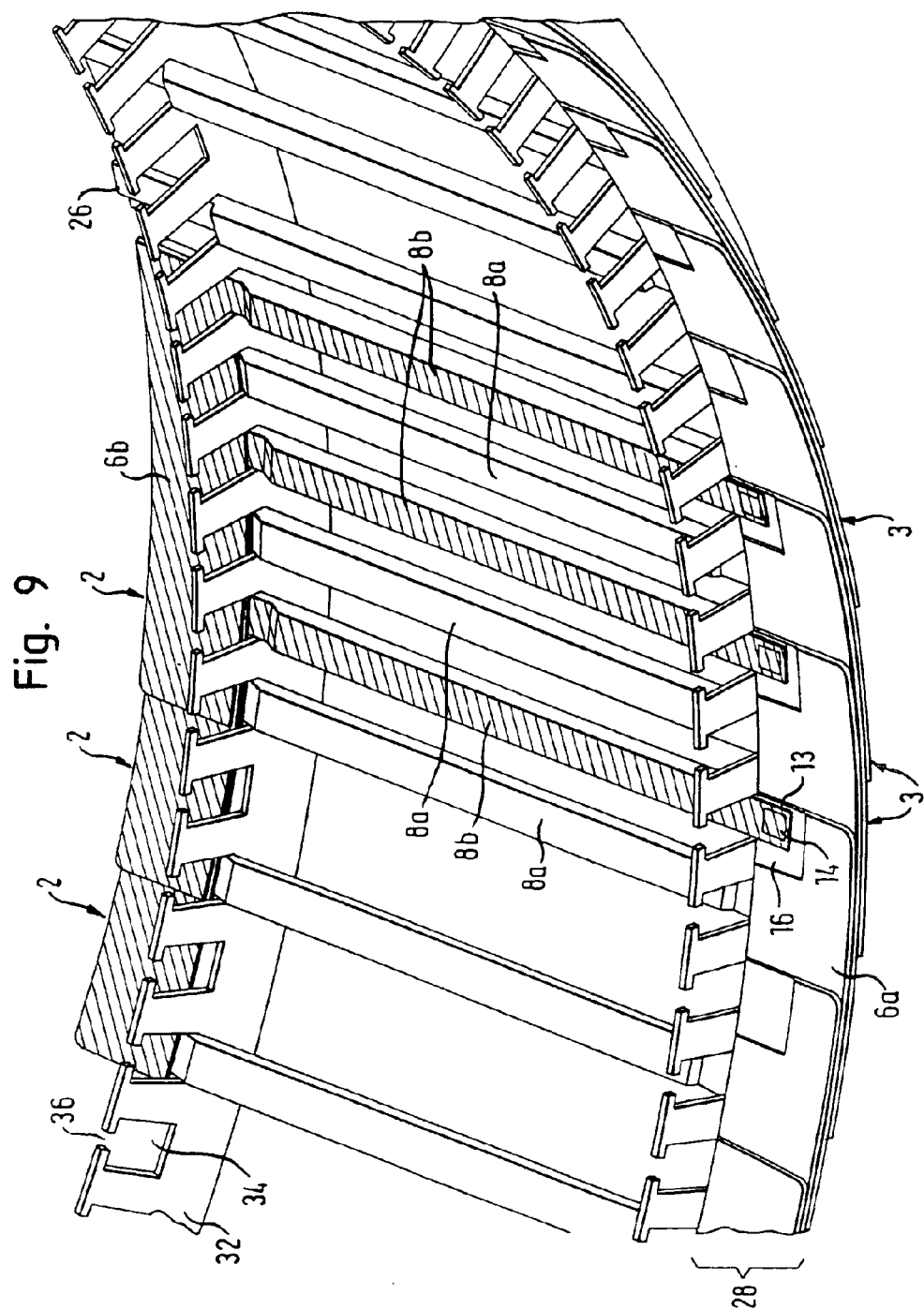
Figure 11:
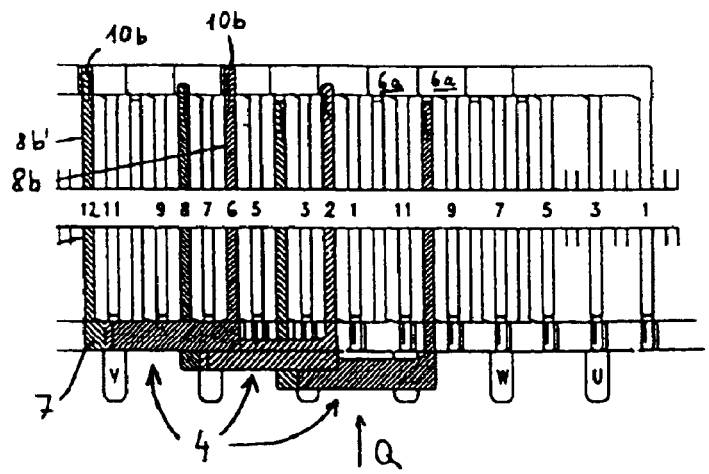
Figure 12:
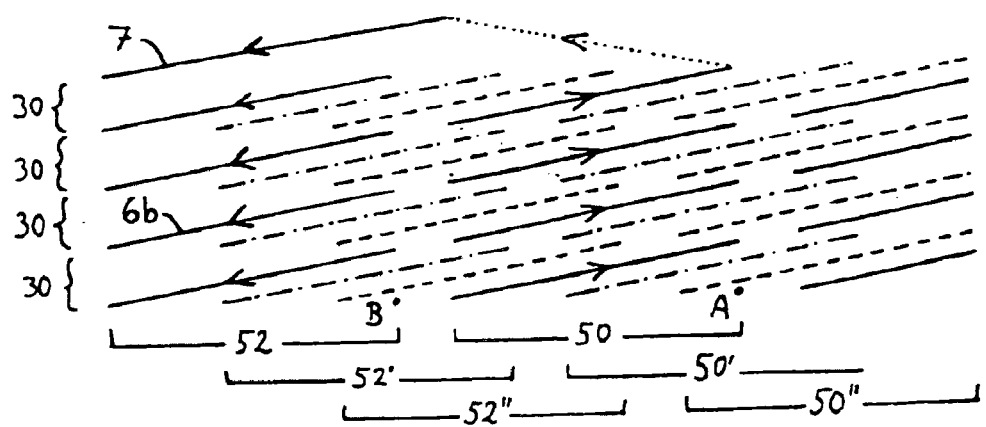
Figure 13:
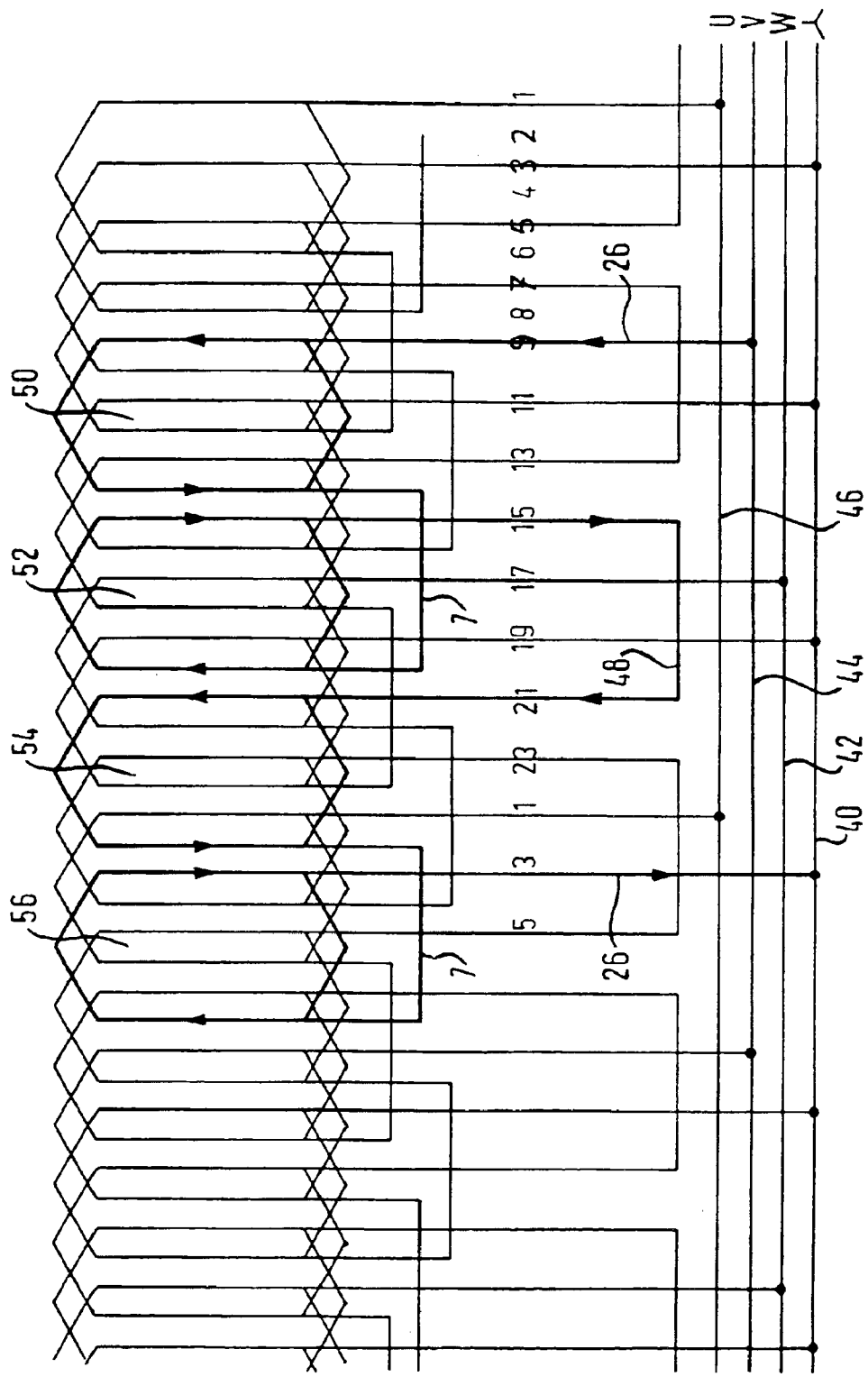
Figure 14:
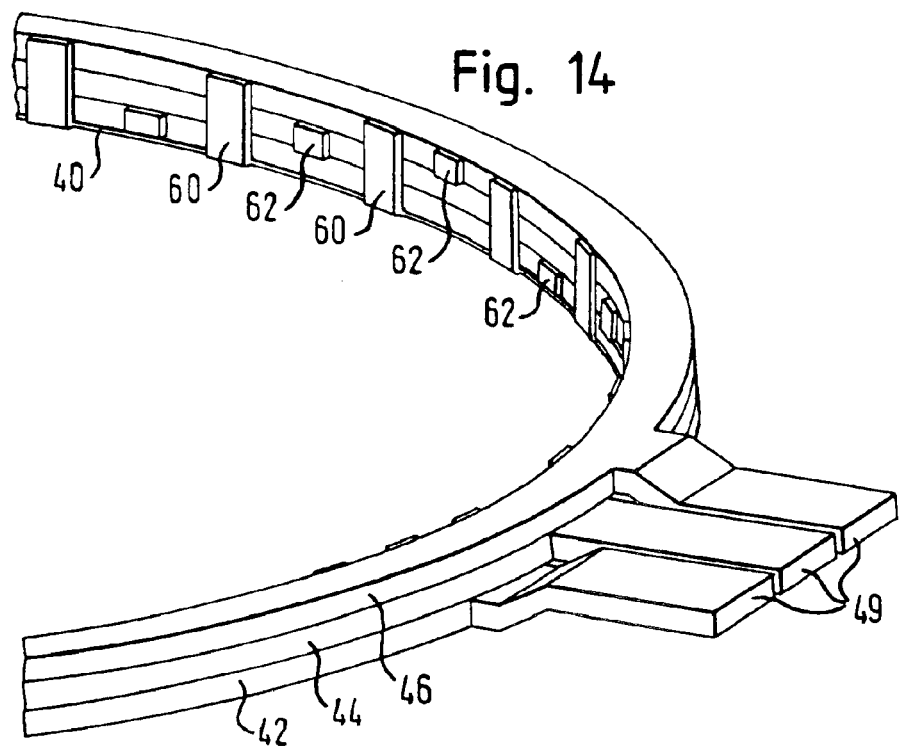
Figure 15:
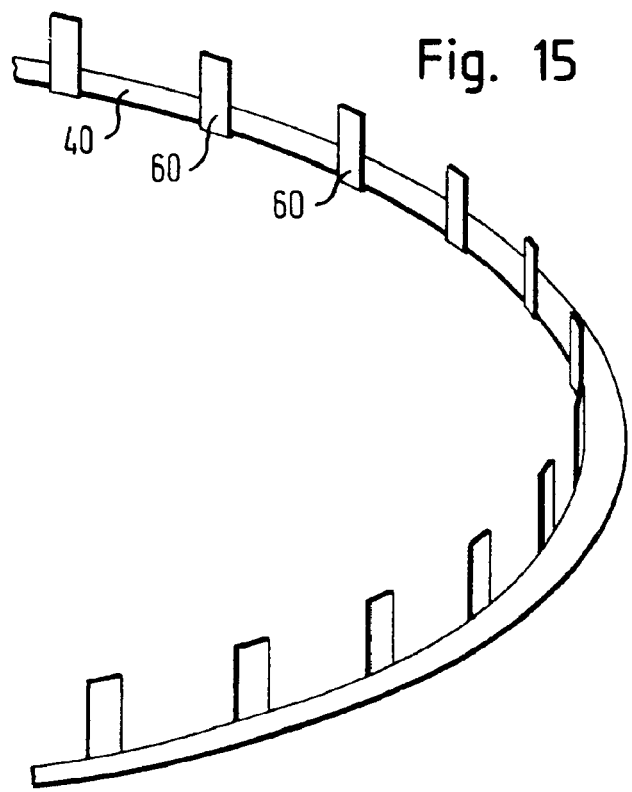
Figure 16:
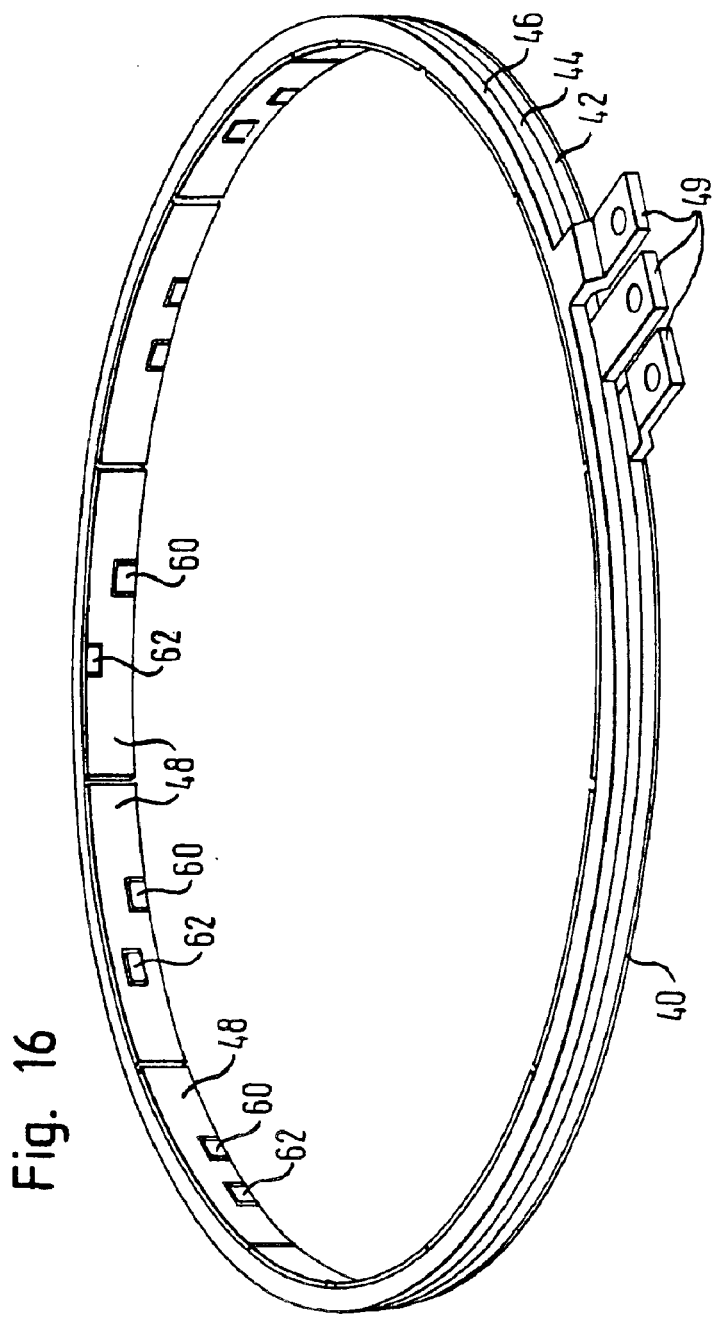
Figure 17:
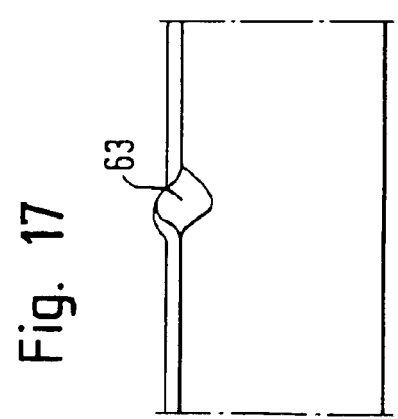
Figure 18B:
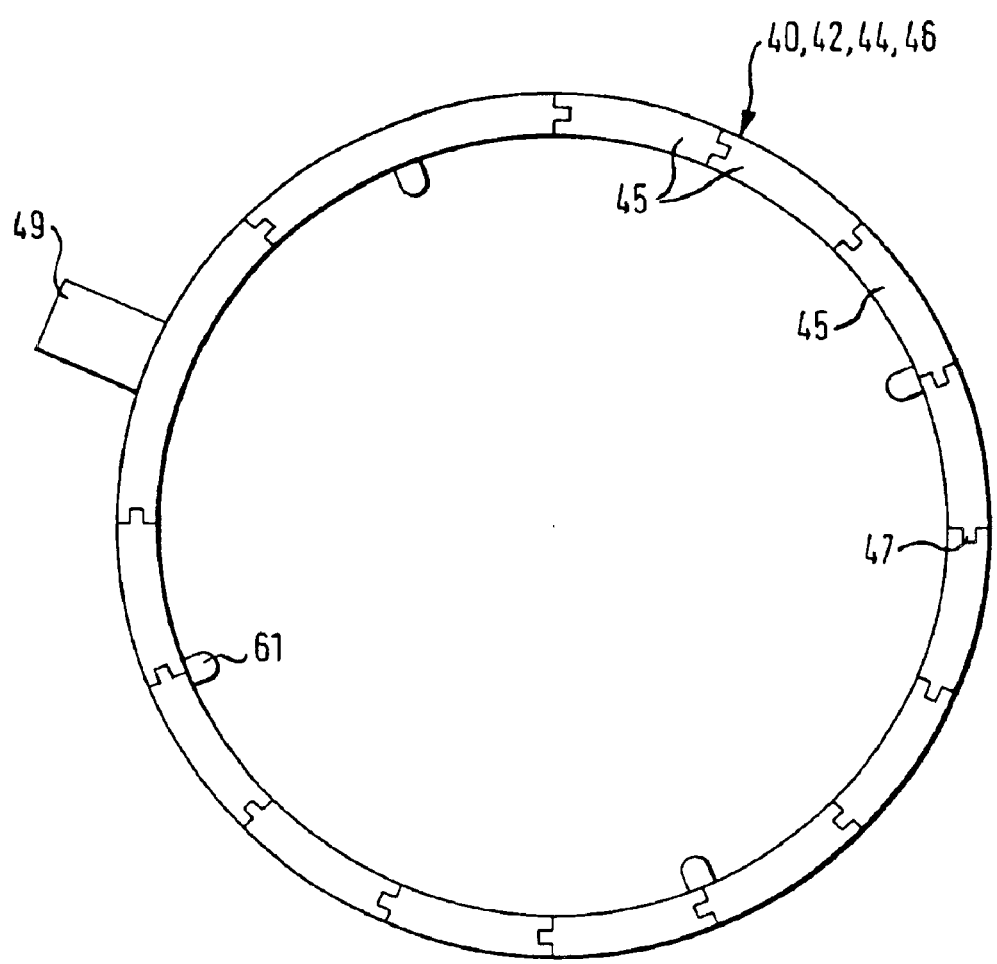
Figure 19:
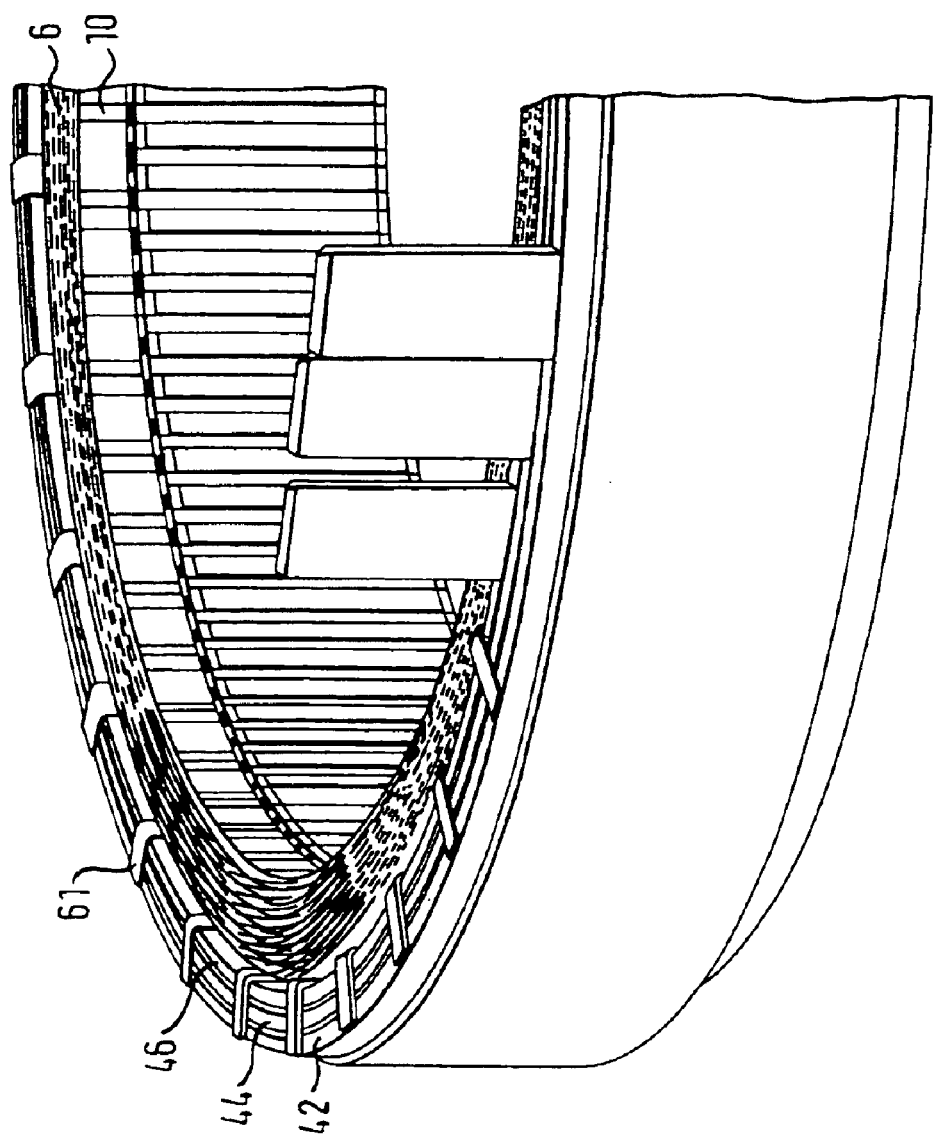

The invention is clarified below with preferred design examples and the attached sample drawing. The drawing shows:

FIG. 1a An exploded view of a first type of L-shaped structural part;

FIG. 1b Sections along lines A—A and B—B in FIG. 1;

FIG. 2 An exploded view of a second type of L-shaped structural part;

FIG. 3 An exploded view of another type of L-shaped structural part;

FIG. 4 An exploded view of yet another U-shaped structural part;

FIGS. 5a-c An exploded view of L-shaped structural parts assembled in different ways;

FIG. 6 An exploded view of an arrangement of several L-shaped structural parts;

FIG. 7 The same view as in FIG. 6 but with an additional L-shaped structural part;

FIG. 8 The same view as in FIG. 7 but with an additional L-shaped structural part;

FIG. 9 An exploded view of a post or armature section of an electric machine with slots in which L-shaped structural parts have been placed;

FIGS. 10a-c Diagrammatic top views of the slots of the post or armature at different points in time during the production of the winding;

FIG. 11 A diagrammatic top view of the slots of a post or armature with U-shaped structural parts;

FIG. 12 A diagrammatic view of the face of a spooled post;

FIG. 13 A winding diagrammatic view of a threephase winding in accordance with a design sample;

FIG. 14 An exploded view of a first design of a conductor rail set;

FIG. 15 An exploded view of the conductor rail for the neutral point from FIG. 15;

FIG. 16 An exploded view of another design of the conductor rail set according to the invention;

FIG. 17 A diagrammatic cross section of a joint of a conductor rail;

FIG. 18a An exploded view of another design of a conductor rail set;

FIG. 18b A diagrammatic top view of a conductor rail;

FIG. 19 An exploded view of a section of a post completely equipped with a winding and a conductor rail set.

Those parts in the drawings with the same or similar functions are in part marked with the same reference signs.

Figure 10:
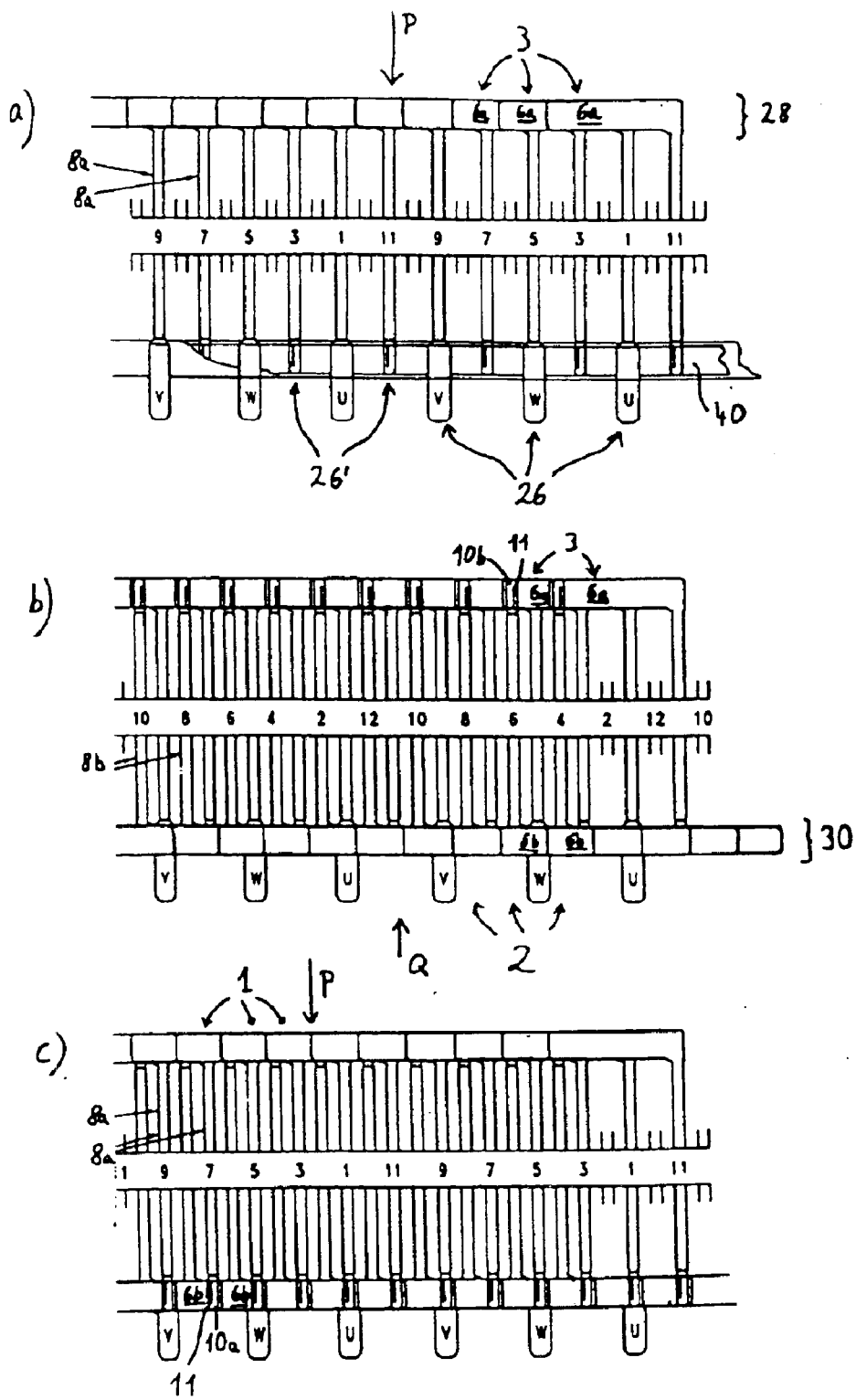

The following clarification of the preferred designs using post windings has been added for the purpose of simplification; this statement equally applies to the corresponding armature windings. FIGS. 9–11, for example, show equal views of a post (in the case of FIG. 9, it is an interior armature device) as well as an armature (in the case of FIG. 9, it is an exterior armature device).

FIG. 1 shows a first type of structural parts. Before clarifying this figure, here are some remarks concerning the preferred designs.

The preferred designs apply to windings for the post of a radial field device with an interior armature. Therefore the lengthwise direction of the slot has been designed as the axial direction, and the direction of the depth of the slot as the radial direction. However, the windings described can also be used for exterior armature and linear devices; furthermore, they can be used as armature windings. An axial field device can also be equipped with an appropriate winding provided the connecting lines have been adapted to the different cylinder jacket shapes of the faces.

The post shown in the figures consists of a post body in the form of a stack of slotted sheet metal in order to incorporate the slot bars of the winding for guiding the magnetic flow. The unslotted part creates the so-called backside. The "faces" refer to the sides of the post body where the slots are cut crosswise. In the case of the radial field devices shown, these are the axial foreparts of the post body.

The term "conductor rails" refers to the current conductor connecting the winding with the power supply. The multiphase windings described generally use a number of phases equal to the number of conductor rails used for the power supply and—in case of a star connection—a conductor rail for the neutral point, the connecting point of the phase branches of the winding. The conductor rails do not apply when the branches are delta connected. Several conductor rails are placed next to one another to create a conductor rail set.

The aspects of the described designs clarified individually below are usually presented in the drawings in combination with one another, even though each aspect can also be realized individually in a winding.

One aspect of the designs described consists of composing the winding at least in part with L-shaped structural parts (L-structural parts), whereby one leg of the L-structural part creates a slot bar and the other leg a connecting line basically running in the direction of the pitch and vertically to the first leg. Connecting the bare end of the slot bar of one structural part with the bare end of the connecting line of another structural part creates a connected winding, and using the preferred designs creates a winding composed of spiral coils. In this case, two L-structural parts connected with one another form one winding of a coil.

The diameter of the slot bars is determined by the diameter of the slot, e.g., rectangular slots will have a rectangular diameter whereby the width basically corresponds with the width of the slot. Consequently, several slot bars are placed on top of one another in one slot. The diameter of the connecting lines, for instance, may also be rectangular. They are, however, favorably flatter than the slot bars, enabling the connecting lines of the coils to be interlaced next to one another in radial layers, for example.

The connection between the bare end of a slot bar (slot bar end) and the bare end of a connecting line preferably consists of a flattened joint bar placed in the connecting area of the slot bar end at the connecting line end and weld them together.

The connecting area has preferably been flattened to the extent that the combined thickness of the joint bar and the connecting line does not exceed that of the connecting lines in the other areas.

In other designs (not shown here), the slot bars and the connecting lines of different structural parts are not connected with joint bars, but with a differently shaped extension of the slot bar attached to the corresponding place or in a corresponding recess at the connecting line. The structural parts are, for example, welded or soldered at the joints, or connected mechanically with clamping joints or sockets and then welded or soldered, if need be.

According to another aspect of the described design, the entire winding requires only few structural parts. One design only requires two different types of L-structural parts, apart from a possible circuit connection for the coils, whereby the connecting line legs must be flatter than the slot bar legs. A first design has been styled to create a connection in one and the same winding location, whereas another design has been styled to create a transition from one winding location into the next. A preferred design has a flattened joint bar at the end of each slot bar leg, whereby the flattened joint bar and the flatter leg of one type of an L-shaped structural part are both located at the level of the top of the slot bar leg. In case of the other type of L-shaped structural part, the flattened joint bar is located at the level of the bottom of the slot bar leg. In this case, a type 1 structural part represents one half of a coil winding. A type 2 structural part completes the winding, whereby the connecting line of this structural part takes the winding to the next winding arrangement. Alternating structural parts of type 1 and type 2 creates a spiral-like coil.

Another design requires only one structural part to build the winding. In this case, coils could be assembled of L-structural parts of type 2 only, for example, provided the slots are large enough to allow a sufficient air flow in the direction of the depth of the slot for the connecting lines between the structural parts. Another option is to place every other slot in a radial position to the other slots in order to allow for a winding with L-structural parts of a certain type.

If need be, other types of structural parts may be used to create a circuit for this type of winding. If necessary, an additional structural part connecting two coils connected in series could be provided, for example. This structural part is preferably L-shaped and composed of two slot bar legs and one connecting line section, and is flatter than the slot bar leg. If need be, another structural part is used to connect a coil with a power supply. In certain designs, this is another type of L-shaped structural part with connecting line legs flatter than those of the slot bar and an extended flattened joint bar at the end of the slot bar leg in order to create a connection with a conductor rail. In other designs, these joint bars are located at the conductor rails allowing the use of a standard type 1 or 2 structural part to connect the winding.

In the preferred manufacturing method, L-structural parts are placed in the slots of the post on axial of the faces. This offers the advantage that the slots can be narrowed at the head with pole shoes, thus making the effective air gap smaller. Once the structural parts have been put in place, they are all connected at the individual slot bar ends with the connecting line leg of the face of the opposing structural part.

In the described method, the structural parts are placed in layers and connected with one another. For this, the winding arrangement is put in place first and the other winding arrangements follow radially from the outside to the inside. The flattened joint bars of the slot bars are placed from above, i.e., radially from the inside onto the corresponding connecting places enabling to reach the connecting areas for welding (e.g., with a laser beam). Of course, the winding can also be mounted in the reverse direction, i.e., from the inside to the outside. In this case, the connecting places are welded radially from the outside.

In the detail, step a shows how one slot bar leg of an L-shaped structural part is placed in several slots, e.g., every other slot, at the face of the post. The slot bars of the structural parts can possibly end up in the same winding position. In step (b), the structural parts' (see step a) slot bar ends which have not been covered yet by other structural parts, are connected at the opposing second face with the connecting line legs of the previously installed structural parts or conductor rails. The slots remaining from step (a) are now all filled at the second face (step c) with a slot bar leg of an L-structural part), covering the joints created in step b. In step (d), the slot bar ends of the structural parts installed in step (c) are connected at the first face with the connecting bar legs of the underlying structural parts. These steps are repeated until the slots are filled completely or almost completely all the way up to the slot head with slot bars. If necessary, structural parts with geometric characteristics suitable for creating a circuit in the winding are installed next. U-shaped structural parts are used through which two spiral-shaped coils are connected in series, or one connecting piece connecting the winding to a conductor rail, for example.

According to another aspect of the preferred design, the connecting lines of interlaced coils are twisted in each other with at least one entire winding. In this case, the connecting lines are placed in layers and preferably flatter than the slot bars, e.g., so flat that the connecting lines of the different interlaced coils belonging to one winding arrangement do not exceed the thickness of one slot bar. By placing several such layers of twisted connecting lines on top of one another, the coils can be composed of any number of windings. The connecting lines of the winding according to DE 197 36 645 A1 are also flatter than the slot bars. In this case however, the connecting lines of interlaced coils are not placed in a staggered way at the faces, but bunched together with the end winding. In order to be able to reach the individual bunches, each connecting line is placed (crimped) offset across from the slot bar connected in the direction of the slot depth. This presents disadvantages (several different structural parts, space required for the placement). In case of a twisted placement of the connecting lines, it is no longer necessary to offset the connecting line across from the slot bars, thus decreasing the space needed for the end windings.

In order to let the flattened connecting lines of interlaced coils in a twisted arrangement run by without crimping, the faces of the post are placed, for example, at a slant angle with the connecting line between both slots from which the slot bars connect them. The connecting line refers to the vertical line on the median of the section of the post defined by both slots. Consequently, the connecting line runs in a different direction for each pair of slots. The slant commutation layers the connecting lines of a winding in a scaled pattern on top of one another.

The examples describe a winding composed of staggered connection lines in L-shaped structural parts. In other designs (not shows here), such a winding is, for example, composed of separate slot bars and connecting lines (I-structural parts), C- or U-shaped structural parts, or composed of structural parts covering a complete winding at the time of the placement (O-structural parts).

In order to make the winding at the faces as compact as possible, a winding pattern with the fewest possible end windings in an interlaced pattern next to one another was found to be favorable. A simple example of this would be a rotary winding with one slot per pole and branch (one-slot winding): In this design, each of the faces has only two end windings in an interlaced pattern. This is different in case of windings with several slots per pole and branch (multi-slot windings), for example, which are used to create a more favorable field in comparison with one-slot windings and are better adjusted to an alternate design. The winding pattern for a rotary current two-slot winding shown on page 331 of "Fachkunde Elektrotechnik", for example, shows each four interlaced end windings at each of the faces. Even a compact staggering of the connecting lines would result in a further protrusion of the end windings. This is because the connecting lines used would generally have to be made wider in order to make up for their low thickness (factor 4) in order to have approximately the same cross-sectional area of the line as the slot bars.

The described designs have a fractional pitch winding enabling a reduction of the number of end windings running by one another in multi-slot windings. The coil width of a fractional pitch winding is smaller than the pole pitch. "Pole pitch" refers to the distance expressed in the slots between two magnetic poles. The slot width indicates how many slots have to be between the first and the second coil side. The preferred designs have a pole pitch 6, but a coil width of only 5. This means that the end windings of the coils are shorter than those in a non-fractional pitch winding since they only have to bridge four instead of five slots. Consequently, the winding sections at the faces are shorter and therefore take up less space thus reducing the resistance loss. In the case of the rotary two-slot winding shown, the pitch of the winding allows to run only three instead of four end windings in an interlaced pattern, for example. This type of fractional pitch winding pattern is extremely favorable for structural part windings in the sense that it allows for a compact end winding area. It can, however, be used for windings made of wire formation offering corresponding advantages.

The windings shown in the design examples have several spiral-like coils whereby two coils are switched in series in such a way that the current in one coil runs through the spiral in the direction of the slot head, and the other in the direction of the bottom of the slot. The connecting lines of the coils are flatter than the slot bars, are layered on top of one another at a slant angle in respect to the connecting line between both slots, and connected with the slot bars. A spiral-shaped coil is formed, for example, when the connecting lines from one face connect slot bars of the same arrangement, and the connecting lines on the other face connect slot bars from radial superimposed layers. This type of winding can be made of L-structural parts, for example. In principle, other structural parts (e.g., U-, C-, I- or O-shaped) or wire-wound coils can also be used.

The serial switch of two spiral-like coils shown allows the connections to the conductor rails to be arranged either at the bottom or at the top of the slot, in other words, both on the same side of the connecting line. This is especially favorable when the conductor rail stack is also placed on this side of the connecting line. In case of single coils (not connected in series), on the other side, a connecting piece would have to be placed crosswise over the connecting line from the slot end to the slot bottom, which would require space in the axial direction. A serial switch allows for a connecting piece switching both coils in series to run parallel to the connecting lines, thus layered radially in a compact way over the connecting lines. The connecting piece could be the centerpiece of a U-shaped structural part, for example.

The structural parts used in the design examples—whether they are L-shaped or differently—are made with non-cutting or cutting metal forming or working techniques such as founding, extruding, sintering, stamping, pressing, milling and bending, or a combination of these manufacturing techniques. The structural parts could be milled, for example, of a piece of sheet metal of the same thickness as the slot bars, the thickness of the milling parts near the connecting lines and the flattened joint bars would be reduced by closed-die stamping, and finally the material displaced as a result of the stamping would be cut off.

Alternatively, a structural part could alternatively be made of semi-finished products, joined with resistance welding, for example. A preferred design would use an L-shaped structural part composed of two bar-shaped so-called I-structural parts with a different cross-section form. In this case for example, one I-structural part would form the leg of the connecting line and another I-structural part would form the leg of the slot bar. The leg of the slot bar could be made of a piece of square wire, whereas a flat wire or a connecting line could be made of a punched flat piece, for example. Because of the simple shape of the I-structural parts, they can be manufactured with little waste.

In another design, the structural parts are composed of several layers. In this case, a bar-shaped component is placed on a flat, L-shaped structural part in the area of the slot bar, for example, making the area of the slot bar thicker. Several layers could be placed on top of one another. In another design, a similar result can be achieved by folding a flat base material in such a way that the desired thickness is obtained in the area of the slot bar.

The structural parts contain conductive materials such as copper or aluminum, or alloys of these metals, and have been mutually insulated.

The windings described are preferably connected with revolving conductor rails along which several coils or groups of coils placed in parallel. These are connected at regular distances determined by the winding pattern along the perimeter of the conductor rail. Therefore, the coil ends are not connected with connecting pieces to central connection points, but could be connected (e.g., welded) directly with the conductor rails.

The winding designs shown stand out by its compact end winding area. In particular, the connecting lines are shaped so flat and arranged in such a way that the end windings do not take up more radial space at the faces than the depth of the slot allows. Therefore, the front-end surface of the post below the slot remains uncovered. The surface is, in other words, the surface at the back of the post, which serves to feed back the magnetic current. This area is available to create a circuit for coils. By placing the conductor rails or other components creating a circuit for the winding in this area, the space can be filled up completely on at least one face of the post, thus minimizing the axial expansion of the magnetic non-active space of the post. Moreover, the conductor rails are located close to the coils. Therefore, the conductor rails for the connection of the winding are preferably installed in the direction of the slot depth below the connection line.

In a first design, several or all conductor rails are layered next to one another in the lengthwise direction of the slots, i.e., in an axial direction, for example, preferably making them border directly to the end windings and therefore allowing for a direct connection with the winding at a short distance. At least one conductor rail at the side facing the connecting lines should have a raised side where the coil ends can be connected. According to another design, on the other hand, several or all conductor rails are layered on top of one another in the direction of the depth of the slot. In both cases, at least one conductor rail on the side facing the connecting lines is equipped with joint bars stretching out over the other conductor rails and each connected with one coil end.

In a fair number of designs, the connecting pieces create another conductor rail between two and two coils in serial switch each time, composed of several sectors insulated against one another with four coils each connected in series.

Incidentally, the configuration with revolving conductor rails is generally favorable for any type of winding for an electric device with coils placed in parallel. The description on hand thus also reveals a winding structure for an electric device with a polyphase winding and several coils or sets of coils of the winding placed in parallel and connected with a revolving conductor rail. In this case, the other characteristics described in claims one through four are not present (but could be optionally present).

The designs described generally use the space at the faces of a post in a compact way, allowing in particular for little axial expansion of the non-active magnetic volume of the post. Moreover, the preferred structural part winding has a high space factor, allowing for a high torque density. Therefore, the preferred designs are very appropriate for the crankshaft starter generator of a motor vehicle, i.e., an electric device serving as a starter and a generator. This device sits in a concentric position on the crankshaft of an internal combustion engine and is preferably connected with this shaft without interstage yet with torsional strength. The starter-generator has a limited expansion capability because of the limited housing space, on the other hand, the direct start requires a high torque.

Returning to FIGS. 1–4, these figures individually present and clarify the structural part types used for the preferred winding.

Figure one shows an exploded view of an L-structural part 1 of the first type. A leg 8a of the L-structural part 1 creates a slot bar 8 in the finished winding, whereas the other leg 6a is located at the faces of the post and connects slot bars 8 lying in different slots. Therefore, slot bars and connecting lines are generally marked with reference numbers 8 and 6, respectively, whereas the slot bar legs and connecting line legs of certain structural parts are indicated with reference numbers 8a, 8b and 6a, 6b respectively.

The connecting lines 6 are flatter and wider than the slot bars 8, as shown in the cross-sections of both legs 6a and 8a in FIG. 1b. The slot bars 8 actually have a thickness H and a width B, whereby the width B in the designs shown has been selected to allow for several slots bars in one slot next to one another, i.e., at the same height from the slot bottom. Thickness h of the connecting line 6, for example, is one third of thickness H of the slot bar 8, whereas width b is about three times width B of the slot bar 8. This means that the cross-section of the line in both legs of the structural part shown is about the same.

Structural part 1 has a flattened joint bar 10a at the bare end of the slot bar 8a. The joint bar 10a of the first type shown in figure one lies at the same height as the connecting line 6a, i.e., on the bottom side of the slot bar leg 8a in the drawing. This means that the (invisible) bottom side of slot bar 8a of the connecting line 6a and a slot bar 8a lying close to the transition region 12 of the joint bar 10a are on the same level. The transition region 12 of the joint bar 10a shows about the same thickness as the connecting line 6a, i.e., approx. one third of the thickness of the slot bar. At the far end of the joint bar 10a, there is a connecting region 13, which is flattened even more compared with the transition region 12, i.e., to about one sixth of the thickness of the slot bar. The transition between regions 12 and 13 is made with a step at the lower side of the joint bar 10a. The connecting region 13 thus leaves a free space of approx. one sixth of the thickness of the slot bar at the bottom side compared with the height of the bottom side of the slot bar 8a.

Two structural parts are connected by placing the connecting area 13 of the joint bar 10a at the end of the connecting line of a second structural part. The connecting area 13 is then connected, e.g., welded, with the connecting line of the second structural part. Therefore, the connecting region 13 of joint bar 10a does not have an insulating coat, just like the joint 16 at the end of the connecting line 6. This is marked in the drawing with a shaded line. Structural part 1 and all other structural parts shown which are not marked with a shaded line have an insulating coat. In order to make sure that the connecting layer located in the densely packed end winding area between two structural parts is not thicker than a connecting line 6, the joint 16 of the connecting line 6a has been flattened to about half the thickness of the connecting line 6a. This way, the joint bar connecting region 13 can be placed and welded to a joint 16 without exceeding the thickness of the connecting line 6 at the connecting region. Since the thickness of the transition region 12, which has been kept as short as possible, and the actual connection is only about one third of the slot bar 8a, it comes with a cross-section contraction. This is accepted in favor of a densely packed end winding arrangement of the connecting line. The transition region 12 can be favorable since it creates a distance between the slot bars and the end winding. The cross-section of the line should be as big as possible. The transition region 12 could also be designed as a continuous transition between the slot bar and the connecting region 13. In other designs where the transition region 12 has been left out, the connecting region 13 is directly connected with the slot bar 8.

FIG. 2 shows a second type of an L-shaped structural part 2, used to create a complete winding of a spiral coil in combination with the first type. Structural part 2 basically has the same design as structural part 1, i.e., the lengths and the cross-sections B—B and A—A of the connecting lines 6a, 6b and joint bars 8a, 8b of both structural parts are the same. Structural part 2 also has a flattened joint bar 10b at the bare end of the slot bar 8b. Contrary to the slot bar 10a of structural part 1, the flattened joint bar 10b is not located at the same height as the connecting line 6b, but offset with the opposing area of the slot bar 8a. The joint bar 10b of structural part 2 is actually located at the height of the side (located on top in FIG. 2) of slot bar 8b, whereas the connecting line 6b—just like with structural part 1—is located at the same height as the bottom side of the joint bar 8b. For the rest, the joint bar 10b of structural part 2 is laid out the same way as joint bar 10a of structural part 1: It shows a transition region 12 directly following the slot bar 8b and about as flat as the connecting line 6b, and yet another flattened connecting region 13 at the outer end of the joint bar 11. This region 13 is so flat that its thickness together with the thickness of the flattened joint 16 of a connecting line 6 is about the same as the thickness H of a connecting line 6. The step between transition regions 12 and 13 is located at the downwards pointing side of the entire joint bar 10b in such as way that the top side of the entire joint bar 10b is located at the same height as the top side of joint bar 8b.

FIG. 3 shows a third type of L-shaped structural part 3, used to connect the winding with the conductor rails. Structural part 3 is basically the same as structural part 1, but comes with an extended joint bar 26 instead of the joint bar 10a. This extended joint bar 26 is connected, e.g., welded, with a conductor rail and therefore has no insulation. The thickness of slot bar 26 is preferably the same as the thickness h of a connecting line 6. Structural parts 3 are favorably located in the lower winding arrangement of the slots, bordering the extended joint bars 26 directly to the conductor rails placed below the slot bars, if need be. Another option would be to place the structural parts 3 in the top winding arrangement.

In another preferred design, the joint bars are placed on the conductor rails in order to connect the winding with the conductor rails. In this case, no special structural parts 3 of the third type are needed and the joint bars 10a of the structural parts 1 of the first type, for example, are welded on the extended joint bars 26 of the conductor rails.

Finally, FIG. 4 shows a type of U-shaped structural part used to create a serial switch for two spiral-shaped coils of one winding. The U-shaped structural part 4 has two slot bar legs 8b, 8b'. The length and the cross-section A—A of these slot bar legs are the same as those of the slot bar legs 8a, 8b of structural parts 1 and 2. Both slot bars 8b, 8b' have a flattened joint bar 10b at the bare end. This joint bar 10b is located in the drawing at the topside of the slot bar 8b, 8b', respectively, and therefore corresponds with the slot bar 10b of the L-structural part 2. The connecting line 7 connecting both slot bars 8b, 8b' has the same cross-section B—B as the connection lines 6a, 6b of structural parts 1 and 2. They are, however, one slot length longer. If the connecting lines 6a, 6b of the structural parts of the first and the second type are, for example, long enough to create a coil with slot bars 8 within a distance of five slots, the connecting line 7 of the U-structural part is extended by connecting two coils, here for example in such a way that both slot bar legs 8b, 8b' end up at a distance of six slots from one another. Another typical detail of the connecting line 7 is that it is not located at one and the same level relative to both slot bar legs 8b, 8b'. It is rather located at the height of the top side (in the drawing) of a slot bar leg 8b on one side, yet on the other side at the height of the bottom side of the other slot bar leg 8b'. If both slot bar legs 8b, 8b' of a U-structural part in a finished winding are in the same winding arrangement, the U-structural part consequently lies at a slight slant angle with both slot bars 8b, 8b' to the connecting line between both slots. The ends of the connecting line legs of these L-shaped structural parts are flattened, as indicated with a welding 27. The U-shaped structural part could be made of two L-shaped structural parts, for example, with flattened areas at the end of the connecting line legs. These flattened areas are placed on top of one another and welded together.

FIG. 5 shows different possibilities to create an L-structural part from different parts instead of only one entire part. The preferred design shown in FIG. 5a has an L-structural part made, for example, of two bar-shaped I-structural parts. The lengths and cross-sections of the I-structural parts required for the connecting line 6 and slot bar 8 are different and could be made of semi-finished products, for example. A slot bar 8 could for example be made by cutting off a square wire with an appropriate cross-sectional shape. A joint bar 10 is stamped on one end (not shown) of the square wire, and the displaced material is cut off. The other end is stamped and cut off in a similar way to create a recess 22 which is placed in an extension 21 and can be connected with the slot bar. The connecting line 6 is preferably stamped from a flat strip. If need be, a flattened joint 16 is stamped at a corner of the connecting line 6 and the recessed material is cut off. The slot bar 8 and connecting line 6 are preferably resistance welded together. For this, welding knobs are preferably stamped in the extension 21. The end of the slot bar 8 shown is possibly stamped even more so this slot bar end has the same thickness as the extension 21 of the connecting line 6. The symmetry created this way between the thickness and the sink heat proves to be favorable. Proper methods to create an electric connection between the connecting line 6 and the slot bar 8 shown in FIG. 5a are, amongst others, welding (with a laser beam), soldering or gluing with a conductive glue, as well as positive or non-positive connections.

The L-structural part in the variants shown in FIGS. 5b and c consists of multiple layers. The structural part in FIG.

5*b*, for example, consists of a flat L-shaped layer 18 and a second layer 19 applied only in the area of the slot bar. The parts of layer 18 protruding from underneath layer 19 create the connecting line 6 on one side and the joint bar 10*a* on the other side. This means that the structural part is a type 1 part. Another layer 20 is added as shown in FIG. 5*c* in order to create a type 2 structural part where the joint bar 10*b* and the connecting line 6 are not located at the same level is added as shown in FIG. 5*c*. This layer protrudes from the slot bar end over layer 19, thus creating a joint bar 10*b*. The thickness of layer 19' in FIG. 5*c* is thinner than layer 19 of FIG. 5*b* by one time the thickness of layer 20. The layers placed on top of one another are preferably soldered, welded (ultrasonic, laser beam or resistance welding), tox clinched or stamp packed.

Next, the construction of a winding with overlapping coils made with L-structural parts will be described as per FIG. 6 through 8. These figures show the composition of the bottom winding layer with few structural parts. For the sake of simplicity, the structural parts are presented without a post lying down on a flat surface. In case of a post body of a radial field device, the structural parts would be located on the interior sheath surface of a cylinder. FIG. 6 shows three type 3 L-shaped structural parts with extended joint bars. The structural parts 3 are located in the winding arrangement right at the bottom of the slots and placed in an offset pattern two slot lengths apart, so each second slot of slot bar 8*a* contains one structural part 3. The extended joint bars 26 are all located at the same face of the post body and connected with the conductor rails (not shown) underneath. The connecting lines 6 on the other side of the post body are placed on top of one another in a scaled pattern, thus creating a layer 28 of connecting lines. Inside the layer of connecting lines 28, the connecting lines are layered in such a way that the bare end is always located in the upper part of this layer and the joint 16 is exposed and accessible, whereas other connecting lines 6*a* cover the other end. The transition between the connecting lines 6*a* and the slot bar 8*a* of the same L-structural part 3 is covered by other connecting lines 6*a*. The transition between the connecting lines 6*a* and the slot bar 8*a* of the same L-structural part 3 is located in the covered area.

As the drawing shows, the connecting layer 28 contains three connecting lines 6*a* on top of one another. Since the thickness h of the connecting lines 6*a* in the design shown is about one third of the thickness H of the slot bar 8*a*, the connecting line layer 28 is nowhere higher than the corresponding layer of slot bars 8*a*.

In the example shown, the connecting lines 6*a* connect slot bars every five slots, as clarified below. In other designs (not shown), the connecting lines connect slot bars at a bigger or smaller distance so there are also more or less three connecting lines on top of one another in one connecting line layer. The thickness h of the connecting lines 6 is favorably selected in such a way that the thickness of each connecting line layer 28 corresponds with the thickness H of a slot bar 8. Other designs, which do not specify a certain structural connecting part for the conductor rails, use structural piece of the first type in the first assembly steps following FIG. 6.

Once each slot has a structural part 3 in accordance with FIG. 6, each remaining slot is each filled with one structural part of type 2 in such a way that its connecting line 6*b* ends up on top of the connecting lines 6*a* of the structural parts 3 inserted previously and located on the opposing face of the post (see FIG. 7). The connecting region 13 of the flattened joint bar 10*b* of structural part 2 herewith ends up on the flattened joint 16 of the connecting line 6*a* of structural part 3. The structural part 2 is connected with structural part 3 in this location, i.e., by welding with a laser beam. A laser beam with adequate energy is pointed at the exposed surface 14 of the connecting region 13 of the joint bar 10*b*. This melts the material of the connecting region 13 of the joint bar 10*b*, merging it with the underlying joint 16 of the connecting line 6. Alternatively, there is a groove in area 13 of the joint bar 10*b*, enabling to point the laser beam directly through this groove at the edge between the end of the joint bar 13 and the joint 16 underneath. In this case, the laser beam does not have to melt the entire thickness of the end of the joint bar 13.

Since the end 13 of the joint bar 10*b* of structural part 2—as clarified in FIG. 2—is located at the level of the top of the slot bar 8*b*, the slot bar 8*b* of structural part 2 ends up in the same winding arrangement as the slot bars 8*a* of the structural parts 3 when it is placed on top of the connecting region of the connecting line 6*a*. This eliminates the difference in height created by the scaled pattern at a slant angle of the connecting lines 6*a* in the connecting line layer 28.

At the opposite face, the connecting line 6*b* of structural part 2 is also located at a slant angle, i.e., at the covered end at the same height as the extended joint bars 26 of the structural parts 3. From this point to the bare end, it is only covered over this joint bar.

FIG. 8 shows the same winding arrangement as FIG. 7, with an additional structural part 2' corresponding with structural part 2. Structural part 2' is connected the same way as structural part 2, i.e., with the end of its joint bar end area 13 at the end of its slot bar leg 8*b*' with the joint 16 of structural part 3. It is connected on the opposite side with the connecting line 6*b*' in a layered scale-like pattern over the connecting line 6*b* of structural part 2 in such a way that the joint 16 ends up over the slot bar end of structural part 3 connecting the joint bar end area 13 of structural part 2'.

A complete winding arrangement of slot bars 8 is obtained by adding additional structural parts 2 and 3 in each second slot in accordance with FIG. 8. The connecting lines of structural parts 2 and 2', respectively, then form a second connecting line layer 30 similar to layer 28 on the other face. Each bare end of connecting lines 6*a*, 6*b* of the structural parts 2, 3 faces upwards in these layers in such a way that the joints 16 are not covered by connecting lines of the same layer. The connecting line layers 28 and 30 are each layered at a slant angle in such a way that the connecting line 6*b* (in the exploded view of the drawing) runs from the left bottom to the right top, and the connecting lines 6*a* from the right bottom to the left top.

A complete winding of a spiral shaped coil is built by welding structural part 2 to the matching structural part 3. The connecting line 6*b* of structural part 2 layered at a slant angle takes the winding to the next-higher winding layer. The spiral is extended by putting a structural part 1—not shown in FIG. 8—on structural part 3 of the first winding. This creates the start of the new winding layer. The connecting area 13 of joint bar 10*a* thus puts structural part 1 on the joint 16 of the corresponding structural part 2 and is connected with it as described above. Since the slot bar 10*a* of structural part 1 is located at the level of the bottom of the slot bar 8*a* of structural part 1, the height difference created in the connecting line layer 30 resulting from the slant layering is not leveled out. On the contrary, it ends up creating a spiral. Structural parts of type 1 are placed on all structural parts 3 in order to create a complete winding. These type 1 structural parts are again welded at the corresponding joints 16 of the structural parts 2. Additional structural parts 2 are placed in the remaining slots, i.e., each second slot on top of the structural parts 2, and then welded to the joints 16 of structural parts 1, thus completing this second winding arrangement. The connecting lines of structural part 1 create another connecting line layer 28. The composition of this layer is the same as the connecting line layer 28 of structural parts 3 shown in FIG. 8. Once the second winding layer has been installed and connected, several interlaced coils with each two windings with connecting lines staggered in one another have been created.

FIG. 12 shows a diagrammatic presentation of the staggering of the connecting lines of interlaced coils. This figure shows a diagrammatic top view of the faces of a spooled post. The front surface of the connecting lines 6b is marked in a simplified way with lines. The connecting lines 6b are arranged in four slant layers 30 on top of one another. The connecting lines 6b of the different branches are marked with different lines, e.g., the connecting lines of branch V with continuous lines, the connecting lines 6b of branch W with dash-dotted lines and the connecting lines of branch U with a dashed line. The different branches alternate within one connecting line layer 30. Layering multiple similar layers and the corresponding connections between the structural parts of these layers creates spiral shaped coils 50, 52, 50', 52', 50", 52" with staggered connecting lines. Each connecting line 6b of a layer 30 belongs to another coil. The connecting lines of branch V, for example, belong to coils 50, 52, those of branch W to coils 50', 52', and the connecting lines of branch U to coils 50", 52". Coil 52" overlaps coils 52, 52' on one side and coils 50, 50' on the other side.

On the other face, the connecting lines 6a are arranged correspondingly, with the difference that the connecting lines 6a of the layer 28 each connect slot bars from winding layers lying upon another, which results in them passing into the next-higher winding layer after each winding.

The end winding arrangement shown in FIG. 12 can also be used for winding which are not composed of L-structural parts, but of any other random structural parts. In principle, the end windings of wire-wound coils can also be staggered instead of evading in bunches at the faces. Even though FIG. 12 shows a three-phase two-slot winding, any random winding of an alternating or direct current generator can be created in a way that the connecting lines of interlaced coils are staggered.

Just like FIGS. 6 through 8, FIG. 9 shows a part of the winding layer located under the slots. The drawing no longer shows the idealization of a leveled developed view, but a cutout of a bent post 32 of a radial field device in an interior armature design (or an armature in an exterior armature design) with structural parts 2, 3 placed in the slots 34. In order to make the actual winding better visible, the design only shows the two faces of the post body 32. The post body 32 is solid of course, and typically composed of electric sheets layered upon another in an axial direction. This means that each face presented of the post body 32 corresponds with the outer sheets of the armature stampings.

Structural parts 2, 3 are located directly above the bottom of the slot in the slots 34. The head 36 of the slots 34 is narrowed so the L-structural parts 2 and 3 can only be slipped in the slots in an axial direction. The face from the spectator's point of view has already been put in a layer of structural parts 3 and three structural parts of type 2 have been put on the opposite face.

The bent presentation of FIG. 9 reveals that the connecting lines 6 of the L-structural parts are slightly bent in a radial direction. This is meant to layer the connecting lines in the most compact connecting line layer 28 on one side, and on the other side to follow the perimeter of the post body. The flexion shown of the connecting line can follow when the structural parts are installed. It is also possible to build the structural parts with the required curvature or to bend them as needed before the installation. FIG. 9 also shows that the slots in the post body of the radial field device shown converge in a radial direction from the slot bottom to the slot head. This means that the distance between two slots is smaller at the slot head than at the slot bottom. It is easy to level this difference in a winding composed of L-structural parts shown since the exact distance between two slot bars 8a, 8b connected with one connecting line 6a or 6b is not defined. The connection area 13 of the joint bars of a slot bar 8a or 8b can rather be placed at a random spot on the connecting line 16 with the connecting line 6a or 6b of a second structural part and where it will be connected with it. The width of the connecting area 16 should have adequate tolerance.

Next, a manufacturing example of the method used to create a winding is clarified on the basis of FIGS. 10a-c. Each figure shows a diagrammatic top view of the slotted side of a post or an armature—one should picture the post or armature body cut open again and wound off in one tier. The narrowing of the slots at the slot head is not shown here, allowing a full view of the top winding layer in the slots. The slots are all numbered from 1 through 12 since the winding arrangement used in this example is repeated every 12 slots.

FIG. 10a shows the post after finishing the first step of the manufacturing process with a structural part 3 placed in the direction of the arrow P in each second slot 1, 3, 5, 7, etc. of the post face located in the top section of the drawing. All connecting lines 6 of the structural parts (in the drawing) point to the left. The structural parts 3 are placed in the slots in sequence from the left to the right to allow for all bare ends of the connecting line 6 to be radially accessible once all structural parts 3 of this layer have been placed. The structural parts 3 in the slots 1, 5 and 9 all show an extended flattened joint bar 26 at the bare end of the slot bar. This joint bar is suitable for connecting the winding with a conductor rail (not shown here) for the current supply phases. The structural parts in the slots 3, 7 and 11 also show a flattened slot bar 26', which is shorter in this example than the extended slot bars 26, and lie on a conductor rail 40 for the star point.

Once the structural parts of this first (partial) layer of the winding have been installed, a second step consists of welding the flattened slot bars 26' and 26 with a laser beam to the subjacent conductor rails.

Next, a structural part 2 is placed in the direction of the arrow Q in each remaining slot from the opposite face (located at the bottom in the drawing) as shown in FIG. 10c. These structural parts are placed in a way that the connecting line 6b of the structural parts 2 in the drawing point to the right. The flattened joint bars 10b at the bare end of the slot bars 8b of structural part 2 all end up on the bare end of a connecting line 6 of a structural part 3. Once all structural parts 2 of this winding arrangement have been placed, the flattened joint bars 10b are welded with a laser beam to the subjacent bare end of the structural parts 6. The winding design presented here has grooves 11 in the flattened slot bars 10b, through which the welding laser beam is able to point directly at the connecting line 6 of a structural part 3.

FIG. 10c shows the post at the end of the next manufacturing step. Here, structural parts 1 are pushed in every other slot 1, 3, 5, 7, etc. in the direction of the arrow P, viewed from the upper face of the post in the drawing. This is done in such as way that the structural parts 1 end up directly opposite the structural parts 3 placed in step 1. The flattened joint bars 10*a* of the structural parts 1 are each at the bare end of a connecting line 6 of a structural part 2 installed in step 3. Once all structural parts 1 have been placed, the flattened joint bars 10*a* of the structural parts 1 are welded with a laser beam to the subjacent connecting lines 6 of the structural parts.

The steps shown in FIGS. 10*b* and 10*c* are repeated until all slots are filled with slot bars, except for the top winding layer. Opposed to the step shown in FIG. 10*b*, in which structural parts of type 2 are placed from the bottom face, U-shaped structural parts of type 4 are placed as shown in FIG. 11. In the drawing, not all U-structural parts have been pushed in completely. The U-structural parts 4 marked with a shaded line each have two slot bars 8*b* and 8*b*' placed in the slots 2 and 8, 4 and 10, 6 and 12. This means that there is a slot bar leg of a U-structural part in every other slot. The connecting line 7 of the U-structural parts are also layered on top of one another in a scaled pattern on the lower face of the post, just like the connecting lines 6 of the L-structural parts. The connecting lines 7, however, are all one slot distance longer than the connecting lines 6 of the L-structural parts. Consequently, the flattened joint bars 10*b* of the slot bars 8*b*, 8*b*' of the U-structural parts all end up on the bare ends of coils belonging to different connecting lines 6*a* of structural parts 1 and are welded with a laser beam in this last step.

Two spiral shaped coils are connected in series in each U-structural part. The following is a detailed description of this in reference to FIG. 12. As mentioned above, FIG. 12 is a highly diagrammatic top view presentation of one face of a spooled post. The face in question corresponds with the lower face shown in FIGS. 10 and 11. FIG. 12 shows the back of the connecting lines 6*b* placed on top of another in several layers 30. For the purpose of pictorialization, the current direction in one of the branches has been marked with arrows in the drawing. The branch U marked with a continuous line starts at point A with a connection to a conductor rail. From there, the branch is guided into a spiral shaped coil 50 over four winding layers or four connecting line layers 30, respectively, to the slot head. The dotted line represents a connecting line 6 on the opposite face of the armature. This connecting line 6 connects a U-structural part. The connecting line 7 of this U-structural part runs over the face shown. Two coils 50 and 52 with an equal layout are connected in series through the U-structural part in such a way that the current flows in an opposite direction through both coils, following the directions of the arrows. This means that the current in the spiral shaped coil 52 depicted flows from the slot head to the slot bottom, whereas in coil 50, it flows from the slot bottom to the slot head. The branch is connected at the star point at point B. The other branches, depicted with dashed or dash-dotted lines, respectively, mark connections with the conductor rails as well as corresponding U-structural parts with connecting lines 7, which have not been marked in FIG. 12.

FIG. 13 shows the winding arrangement for the winding shown in FIGS. 1 through 12. It shows how the individual coils are distributed over the slots of the post, whereby this winding arrangement has only one coil side in each slot (single-layer winding). The winding arrangement is repeated every 12 slots and laid out as a threephase winding (rotary winding) with two slots per pole and branch (two-slot winding). This results in a pole pitch of six, i.e., the distance between two poles is six slots. In case of a full-pitch winding, the coil width, i.e., the distance between both coil sides of a coil expressed in slots full-pitch winding, therefore also equals six. The coil width of the winding shown in FIG. 13, however, is smaller than the pole pitch, i.e., equals five. Therefore this is a so-called fractional pitch winding. The fractional pitch results in the winding heads of no more than three coils are guided along one another at the faces of the post. For the winding designs described above, this means that a compact winding head arrangement is obtained when the thickness h of the connecting line is one-third or smaller than the thickness H of the slot bars.

A branch V in FIG. 13 is printed in bold for the purpose of clearness. The other branches U, W run accordingly. Branch V consists of two coils 50, 52 connected in series, which are presented here in a simplified way as closed rings—whereas they actually are spirals with eight windings, for example. On one side, the coil 50 is connected electrically with the conductor rail 44 for branch V, and on the other side with the coil 52 via a connecting piece 7 (which could be a U-structural part, for example) bridging six slots. This is (in a design not shown in FIG. 13) connected with the conductor rail marked with a Y for the star point 40. The immediate current direction has been marked with arrows. Both coils 50, 52 are located in neighboring slots with their coil sides facing one another, in such a way that the current in both neighboring slots flows in the same direction. There are each time four coil sides of coils from other branches between the coil sides of a coil 50, 52.

The arrangement of the winding heads does not become clear from the winding arrangement of FIG. 13. If, however, the connecting lines are layered in a compact way as described above, there is hardly any spacing in the densely packed "winding head arrangement. Therefore, the connecting pieces 7 necessary to connect two coils in series are either conveniently located at the slot head or at the slot bottom, i.e., at the edge of the winding head package. If the winding basically consists of spiral shaped coils (i.e., coils in which the connecting lines do not overlap in a radial direction), a connecting piece 7 connects two coils 50, 52 in series at once in such a way that the current flows in the direction of the slot head in one coil and in the other coil in the direction of the slot bottom. However, since the above described layering of the connecting line is identical for both coils 50, 52, connecting piece 7 connects both coils 50 and 52 in series in such a way that the current flows in an opposite direction, i.e., negative phase sequence, through both spirals. As a result of this serial connection, the connections between the branches and the conductor rails for the current supply 42, 44, 46, as well as for the star point 40 automatically all end up on one radial side of the winding head package, actually on the other side of the connecting pieces. The conductor rails are also conveniently located on this side.

An alternative consists of connecting four coils, or another even number of coils in series each time, as shown of FIG. 13. The winding arrangement of FIG. 13 has two pairs of coils connected in series are again connected in series each time with another connecting piece 48. The connecting pieces 48 can be laid out the same way as the connecting pieces 7; following another layout, they create sectors of an additional conductor rail.

FIGS. 14–19 show compact design examples of the conductor rail package. The conductor rails run around the post allowing the connection of several coils or groups of coils placed in parallel along the perimeter. The current flow through the current supply of conductor rails is generally higher. Therefore, the diameter of the conductor rails is relatively large in order to minimize the resistance losses. As a result of this, the conductor rails take up a lot of space. In order to limit the axial expansion of the post as much as possible, the conductor rails in this area in the examples shown are arranged in a radial way next to the slot openings on one face of the post. The surface at the face remains bare anyway in the compact winding head arrangement described above, and this space-saver can therefore be used for the current supply. The conductor rail packages are therefore particularly suited for connecting the winding described above. However, they can be combined with any winding, in principle.

FIG. 14 shows an example of an arrangement of the conductor rails for a rotary current winding according to a first design. As mentioned, the conductor rails are arranged in the direction of the slot depth below the winding heads and connected with connection 49 with the rotary current source in this case. The conductor rails shows in FIG. 14 are layered on top of one another in lengthwise direction, i.e., axial direction of the slots, in such a way that each conductor rail ends up directly adjacent to the radial inside of the winding heads. The joints 60, 62 connecting the branches with the conductor rails are therefore arranged on the radial inside of the conductor rails. The winding can therefore be directly connected, for example welded or soldered, to the conductor rails 40, 42, 44, 46 without any other connecting pieces, for example when the winding consists in part of special structural parts 3 with extended joint bars 26 at the slot bar end reaching all the way to the joints 60, 62.

It should be guaranteed, however, that each extended joint bar 26 contacts only one of the conductor rails 40, 42, 44 or 46. For this purpose, the joint 62 of the conductor rails 42, 44, 46 are equipped with an electric insulating coat with windows, offsetting one another in such a way that each joint bar 26 contacts one window at the most. According to another variant shown in FIGS. 14, 15 and 17, the current rings at the contact points 62 show elevations, so-called welding bulges 63, sticking out radially to the inside. If an extended joint bar contacts a welding bulge 63 and is welded to it, the joint bar is kept at a distance of the other conductor rails at the same time. The welding bulge 63 is stamped for example into the conductor rails 42, 44, 46 by pressing the conductor rails 42, 44, 46 in an axial direction at those spots where a welding bulge 63 should be created, thus creating a bulge 63 from displaced material on the radially inwards facing side of the conductor rail. The displaced material could be shaped like a protruding banner, for example (see FIG. 17).

If need be, the winding is not only connected for the current supply with the conductor rails, but also with a conductor rail connecting three branches, the so-called star point. Alternatively, the branches can also be delta connected, thus eliminating the need for conductor rails for the star point. Since the current in the three phases of a rotary current source are dephased by 120° to one another, the sum of the currents flowing in the star point nearly equals zero at any time. For the sake of saving space, the conductor rail for the star point 40 has therefore a smaller cross-sectional area than the conductor rails 42, 44, 46 for the current supply, i.e., the cross-sectional area is thinner in an axial direction than the other conductor rails 42, 44, 46. The star point conductor rail 40 in the example shown in FIG. 14 is too thin to have a structural part of the winding welded on the inner radial area of a structural part of the winding. Therefore, it has joint bars 60 instead of welding bulges 63 extending in an axial direction over the radial inner area of the other conductor rails. The extended joint bar 26 of a structural part 3 could be welded on these joint bars 60, for example. For the sake of clearness, FIG. 15 presents the conductor rail for the star point 40 with the joint bars 60 without the other conductor rails.

The conductor rail packet shown in FIG. 14 is suitable for connecting a threephase winding with any winding layout. The conductor rail packet shown in FIG. 16, on the contrary, is very suitable for connecting the rotary current winding with four coils each connected in series. It has the same components as FIG. 14, in particular three axially layered conductor rails 42, 44, 46 connecting the winding with the electric current supply. These conductor rails all have joints 62 shaped as welding bulges 63, as well as a conductor rail 40 for the star point, which is equipped with joint bars 60 extending over the radial interior surface of at least one of the conductor rails. It additionally has another rail, a sector piece conductor rail 48 arranged on the radial inner side of the conductor rail package, whereby the joints 60 and 62 of the remaining conductor rails 40, 42, 44, 46 are accessible through the corresponding recesses in the sector conductor rails 48 and can be put in contact with the winding. The sector piece conductor rail 48 is not continuous, but consists of sector pieces insulated electrically from one another. They build the connecting pieces marked as 48 in the winding arrangement of FIG. 13 between two pairs of coils connected in series. For this purpose, the extended joint bars 26 of structural parts 3 of the coils 52 and 54 belonging to the different coil pairs are welded with both ends of a sector 48.

Following yet another design, the conductor rails are layered in a radial direction as shown in FIG. 18a, and not in an axial direction. Only one conductor rail 46 is arranged directly at the winding heads in this arrangement, whereas the other conductor rails 42, 44 do not have direct access to the winding. Therefore, all conductor rails are equipped with joint bars 61 protruding radially to the inside over other conductor rails or over the winding heads if need be. The winding is connected for example by bending the end of these joint bars 61 to the inside, and welding the extended joint bar 26 of a structural part 3 to the bent end. This example also allows for arranging a conductor rail 48 subdivided in sectors in a radial direction on the inside of the conductor rail packet, or arranging a conductor rail for the star point in a radial or an axial direction over the other conductor rails 42, 44, 46. The conductor rails could be made of rings cut out of a plate, for example. This results in quite a bit of waste however. Therefore, it is preferred to create the conductor rails by bending a bar with an appropriate cross-section or individual ring sectors. FIG. 18b shows such a conductor rail 40, 42, 44, 46 made off individual ring sectors. Press fitting is preferred to connect the sectors, whereby extensions 47, for example, are pressed in corresponding recesses in the ends of the sectors. The conductor rails are favorably turned into a packet in such a way that the joints between the sectors of interlaced conductor rails are offset, thus increasing the stability of the conductor rail packet.

FIG. 19 shows a winding design in a post of an electric radial field machine with a conductor rail packet, corresponding with the one shown in FIG. 18. The space-saving use of the area at the face of the post 32 becomes very clear here, as well as the staggered arrangement of the coils overlapping the connecting lines 6.

The windings described in the different examples of arrangements can be made with a few different, simple structural parts and stand out because of a space-saving arrangement of the winding heads.

What is claimed is:

1. A method of producing a winding from preformed parts for a stator or rotor of an electric machine having slots, wherein a rotational axis of the electric machine defines an axial machine direction and radial machine directions perpendicular to the axial machine direction, the radial machine directions at a certain axial position defining a radial plane, wherein the finished winding comprises a plurality of overlapping coils with at least one complete turn, wherein the coils have connecting conductors located at faces of the stator or rotor, and wherein the connecting conductors of the overlapping coils are interlaced and therefore arranged in layers, said method comprising:

using L-shaped preformed parts with two legs, one leg forming a slot bar and the other one a connecting conductor, producing the winding by repeatedly: (a) placing L-shaped preformed parts in the slots of the stator or rotor until an entire or partial winding layer has been placed, wherein the connecting conductors of the different interlaced coils are placed, with an offset, on top of one another in a direction lying in a common radial plane, thereby forming a stack of connecting conductors of different interlaced coils layered in directions lying within the radial plane, and (b) connecting the preformed parts placed in (a) with preformed parts placed in a previous stage, at connection areas, wherein the connection area are located, in the radial direction on top of the stack.

2. The method of claim 1 wherein the L-shaped preformed parts have slot bars with a bare end, and the L-shaped preformed parts are inserted from the faces into the slots of the stator or rotor, and are connected to from the winding by connecting the bare end of the slot bar of a preformed part inserted from one face of the stator or rotor with the connecting conductor of another preformed part inserted from the other face of the stator or rotor.

3. The method of claim 1 comprising repeating the activities (a) and (b) until at least some of the slots are filled up except for one winding layer, inserting special preformed parts into these slots suitable to interconnect coils.

4. A winding for an electric machine having at least one of a stator or rotor with slots, wherein a rotational axis of the electric machine defines an axial machine direction and radial machine directions perpendicular to the axial machine direction, the radial machine directions at a certain axial position defining a radial plane, comprising:

a plurality of overlapping coils with at least one complete turn, said coils being made of preformed parts;

wherein the coils comprise slot bars connecting conductors, said connecting conductors being located at faces of the stator or rotor;

wherein the connecting conductors of the overlapping coils are interlaced and therefore arranged in layers;

wherein the winding is produced by (i) inserting L-shaped preformed parts having two legs, one leg forming a slot bar and the other one a connecting conductor, with their slot bars into the slots and placing the connecting conductors of the different interlaced coils, with an offset, on top of one another in a direction lying in a common radial plane, thereby forming a stack of connecting conductors of different interlaced coils layered in directions lying within the radial plane, and by (ii) connecting the connecting conductors connection areas;

wherein the connection areas at which pairs of preformed parts of a layer are connected are located, in the radial direction, on top of the stack and are therefore covered by the preformed parts of a next layer.

5. The winding of claim 4, wherein the L-shaped parts have first and second legs, and the slot bars positioned in the slots are formed by the first legs and the connecting conductors arranged at one of the stator's or rotor's faces are formed by the second legs.

6. The winding of claim 4, wherein the winding has a plurality of coils formed by slot bars arranged in the slots and connecting conductors arranged at the stator's or rotors faces, and wherein the connecting conductors are flatter than the slot bars, and wherein the winding is a fractional pitch winding with two slots per hole and branch.

7. The winding of claim 6, wherein the winding is a three-branch two-slot winding with a coil width of five slots.

8. The winding of claim 4, wherein the slots have slot heads and slot bottoms, and wherein at least two of the coils formed by slot bars and connecting conductors are connected in series enabling current to flow through one of the coils in the direction of the slot head and the other coil in the direction of the slot bottom.

9. The winding of claim 8, wherein the at least two coils are connected in series by a U-shaped connecting piece having two slot bars and a connecting conductor section.

10. The winding of claim 8, wherein the at least two coils are arranged to enable current to flow in opposite directions of rotation through the two coils connected in series.

11. The winding of claim 8, wherein the at least two coils are arranged in series forms a series-coil ensemble having two onsets, wherein the onsets are arranged on the same side—viewed in the direction from the slot head to the slot bottom—of the connecting conductors.

12. The winding of claim 4, wherein the connecting conductors are flatter and wider than the slot bars.

13. The winding of claim 4, wherein the connecting conductors of the overlapping coils are flatter than the slot bars at least to an extent that a layer of connecting conductors belonging to one layer of slot bars is not higher than the slot bar.

14. The winding of claim 4, wherein the connecting conductors at the faces of the stator or rotor are inclined relative to a virtual line connecting the slots the slot bars of which are connected by said connecting conductors.

15. The winding of claim 4, wherein the connecting conductors are located at one face of the winding connect the slot bars of the same winding layer, and the connecting conductors located at the other face of the winding connect the slots bars of superimposed winding layers, whereby a coil is formed.

16. The winding of claim 4, wherein the preformed parts are made of several layers.

17. The winding of claim 4, wherein the L-shaped preformed parts are made of two bar-shaped I-shaped parts with at least one of a different cross-sectional shape and a different cross-sectional area.

18. The winding of claim 4, wherein the slot bars of the L-shaped shaped parts have a bare end, and wherein they have, at their bare end, a flattened joint bar.

19. The winding of claim 18, wherein the bare ends of the connecting conductors of the L-shaped preformed parts have a connecting area on which the flattened joint bar of another preformed part can be placed to make a connection with the other preformed part.

20. The winding of claim 4, wherein the preformed part has no offset in the direction of the slot between the slot bar and the attached connecting conductor.

21. The winding of claim 4, wherein several coils or groups of parallel coils are connected with a conductor rail arranged around the stator or rotor.

* * * * *